United States Patent
Yang et al.

(10) Patent No.: US 9,030,730 B2
(45) Date of Patent: May 12, 2015

(54) OPTICAL PHASE-SENSITIVE AMPLIFIER FOR DUAL-POLARIZATION MODULATION FORMATS

(71) Applicant: Fujitsu Limited, Kanagawa (JP)

(72) Inventors: Jeng-Yuan Yang, Garland, TX (US); Motoyoshi Sekiya, Richardson, TX (US); Yoichi Akasaka, Allen, TX (US)

(73) Assignee: Fujitsu Limited, Kawasaki-shi (JP)

( * ) Notice: Subject to any disclaimer, the term of this patent is extended or adjusted under 35 U.S.C. 154(b) by 304 days.

(21) Appl. No.: 13/741,177

(22) Filed: Jan. 14, 2013

(65) Prior Publication Data

US 2014/0198375 A1    Jul. 17, 2014

(51) Int. Cl.
*G02F 1/35* (2006.01)
*G02F 1/39* (2006.01)
*H04B 10/50* (2013.01)

(52) U.S. Cl.
CPC ............... *G02F 1/39* (2013.01); *G02F 1/3536* (2013.01); *H04B 10/50* (2013.01); *G02F 2203/07* (2013.01)

(58) Field of Classification Search
USPC .............................................. 359/330
See application file for complete search history.

(56) References Cited

U.S. PATENT DOCUMENTS

| | | | |
|---|---|---|---|
| 8,909,062 B2 * | 12/2014 | Yang et al. | 398/175 |
| 8,909,063 B2 * | 12/2014 | Yang et al. | 398/180 |
| 2011/0176202 A1 * | 7/2011 | Kato et al. | 359/337.5 |
| 2013/0071113 A1 * | 3/2013 | McKinstrie | 398/39 |
| 2013/0314769 A1 * | 11/2013 | Inafune et al. | 359/341.3 |

* cited by examiner

*Primary Examiner* — Hemang Sanghavi
(74) *Attorney, Agent, or Firm* — Baker Botts L.L.P.

(57) ABSTRACT

A method for amplifying optical signals includes determining a source optical signal, generating a first resultant signal including a pump signal and the source optical signal, sending the first resultant signal through a non-linear element to generate a second resultant signal including the first resultant signal and an idler signal, and sending the second resultant signal through a non-linear element to perform phase-sensitive amplification. The phase-sensitive amplification results in a third resultant signal including an amplified source optical signal, the pump signal, and the idler signal. The method also includes filtering the third resultant signal to remove the pump signal and the idler signal and outputting the amplified source optical signal.

33 Claims, 13 Drawing Sheets

OPTICAL PHASE-SENSITIVE AMPLIFIER FOR DUAL-POLARIZATION MODULATION FORMATS

TECHNICAL FIELD OF THE INVENTION

The present invention relates generally to optical communication networks and, more particularly, to optical phase-sensitive amplifier for dual-polarization modulation formats.

BACKGROUND

Telecommunications systems, cable television systems and data communication networks may use optical networks to rapidly convey large amounts of information between remote points. In an optical network, information may be conveyed in the form of optical signals through optical fibers. Optical fibers may comprise thin strands of glass capable of communicating the signals over long distances with very low loss. Optical networks often employ modulation schemes to convey information in the optical signals over the optical fibers. Such modulation schemes may include phase-shift keying ("PSK"), frequency-shift keying ("FSK"), amplitude-shift keying ("ASK"), and quadrature amplitude modulation ("QAM").

In PSK, the information carried by the optical signal may be conveyed by modulating the phase of a reference signal, also known as a carrier wave. The information may be conveyed by modulating the phase of the signal itself using differential phase-shift keying ("DPSK").

In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK ("BPSK" or "2-PSK") using two phases at 0° and 180° (or 0 and $\pi$) on the constellation diagram; or quadrature PSK ("QPSK", "4-PSK", or "4-QAM") using four phases at 0°, 90°, 180°, and 270° (or 0, $\pi/2$, $\pi$, and $3\pi/2$). Phases in such signals may be offset. Each of 2-PSK and 4-PSK signals may be arranged on the constellation diagram.

M-PSK signals may also be polarized using techniques such as dual-polarization QPSK ("DP-QPSK"), wherein separate m-PSK signals are multiplexed by orthogonally polarizing the signals. M-QAM signals may also be polarized using techniques such as dual-polarization 16-QAM ("DP-16-QAM"), wherein separate m-QAM signals are multiplexed by orthogonally polarizing the signals.

SUMMARY

In one embodiment, a method for amplifying optical signals includes determining a source optical signal, generating a first resultant signal including a pump signal and the source optical signal, sending the first resultant signal through a non-linear element to generate a second resultant signal including the first resultant signal and an idler signal, and sending the second resultant signal through a non-linear element to perform phase-sensitive amplification. The phase-sensitive amplification results in a third resultant signal including an amplified source optical signal. The method also includes filtering the third resultant signal to remove the pump signal and the idler signal and outputting the amplified source optical signal.

In another embodiment, a system for amplifying optical signals includes an input configured to accept a source optical signal, a pump source configured to generate a pump signal, a coupler configured to add the pump signal to the source optical signal to yield a first resultant signal, a first controller, a second controller, and a filter. The first controller is configured to split the first resultant signal into an x-polarization component and a y-polarization component and send the x-polarization component of the first resultant signal and the y-polarization component of the first resultant signal bi-directionally through a first non-linear element to generate an x-polarization component and a y-polarization component of a second resultant signal including the first resultant signal and an idler signal. The second controller is configured to send the x-polarization component of the second resultant signal and the y-polarization component of the second resultant signal bi-directionally through a second non-linear element to perform phase-sensitive amplification. The phase-sensitive amplification results in a third resultant signal including an amplified source optical signal. The filter is configured to filter the third resultant signal and output the amplified source optical signal.

In yet another embodiment, a system for amplifying optical signals includes an input configured to accept a source optical signal, a pump source configured to generate a pump signal, a coupler configured to add the pump signal to the source optical signal to yield a first resultant signal, a controller, and a filter. The controller is configured to split the first resultant signal into an x-polarization component and a y-polarization component, and route the x-polarization component of the first resultant signal bi-directionally through a first non-linear element to yield an x-polarization component of a second resultant signal. The first non-linear element is configured to perform phase-sensitive amplification on the x-polarization component of the first resultant signal. The controller is also configured to route the y-polarization component of the first resultant signal bi-directionally through a second non-linear element to yield a y-polarization component of the second resultant signal. The second non-linear element is configured to perform phase-sensitive amplification on the y-polarization component of the first resultant signal. The controller is also configured to combine the x-polarization component of the second resultant signal and the y-polarization component of the second resultant signal to yield the second resultant signal. The filter is configured to filter the second resultant signal and output an amplified source optical signal.

In still yet another embodiment, a system for amplifying optical signals includes an input configured to accept a source optical signal, a pump source configured to generate a pump signal, a coupler configured to add the pump signal to the source optical signal to yield a first resultant signal, a polarization-maintaining non-linear element communicatively coupled to the coupler, and a filter and configured to filter an amplified signal and output an amplified source optical signal. The polarization-maintaining non-linear element is configured to add an idler signal to the first resultant signal as the first resultant signal passes through the polarization-maintaining non-linear element in a first direction that yields a second resultant signal, sends the second resultant signal to be rerouted to the polarization-maintaining non-linear element, receives the second resultant signal, and performs phase-sensitive amplification on the second resultant signal as the second resultant signal passes through the polarization-maintaining non-linear element in a second direction, yielding the amplified signal. The first direction and second direction are opposites.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
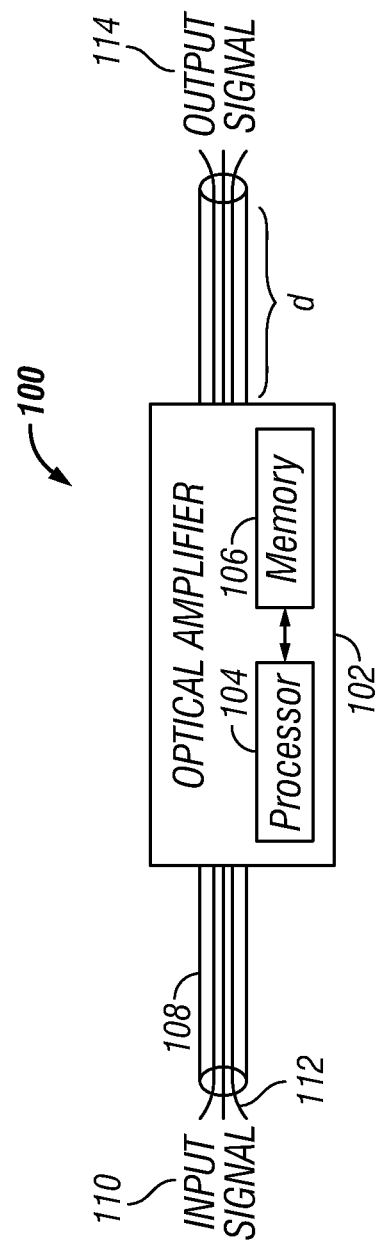
FIG. 1 illustrates an example embodiment of a system configured to provide optical phase-sensitive amplification for dual-polarization modulation formats.

FIG. 1 illustrates an example embodiment of a system 100 configured to provide optical phase-sensitive amplification for dual-polarization modulation formats. In one embodiment, system 100 may include components with a wavelength selective processor to conduct optical signal amplification. Such implication may be performed on any suitable signal such as a QPSK signal. In a further embodiment, such wavelength selective processors may be reconfigurable. In another embodiment, system 100 may include bi-directional phase-sensitive amplification to conduct optical phase-sensitive amplification for dual-polarization modulation formats. In a further embodiment, such phase-sensitive amplification may be degenerate. One or more optical amplifiers, such as optical amplifier 102, may conduct the optical phase-sensitive amplification for dual-polarization modulation formats.

Optical amplifier 102 may be configured to amplify optical signals in system 100. System 100 may include an input signal 110 to be amplified as output signal 114 by optical amplifier 102. Signals may be transmitted in system 100 over an optical network 108, which may include one or more optical fibers 112 of any suitable type. System 100 may include optical amplifier 102 in any suitable portion of system 100 or an optical network, such as in a transmission line between two optical components or in a reconfigurable optical add-drop multiplexer ("ROADM"). Furthermore, optical amplifier 102 may be configured to operate as a stand-alone device or as part of another piece of optical transmission equipment. Optical amplifier 102 may be placed a distance d from a subsequent piece of optical equipment.

Figure 2:
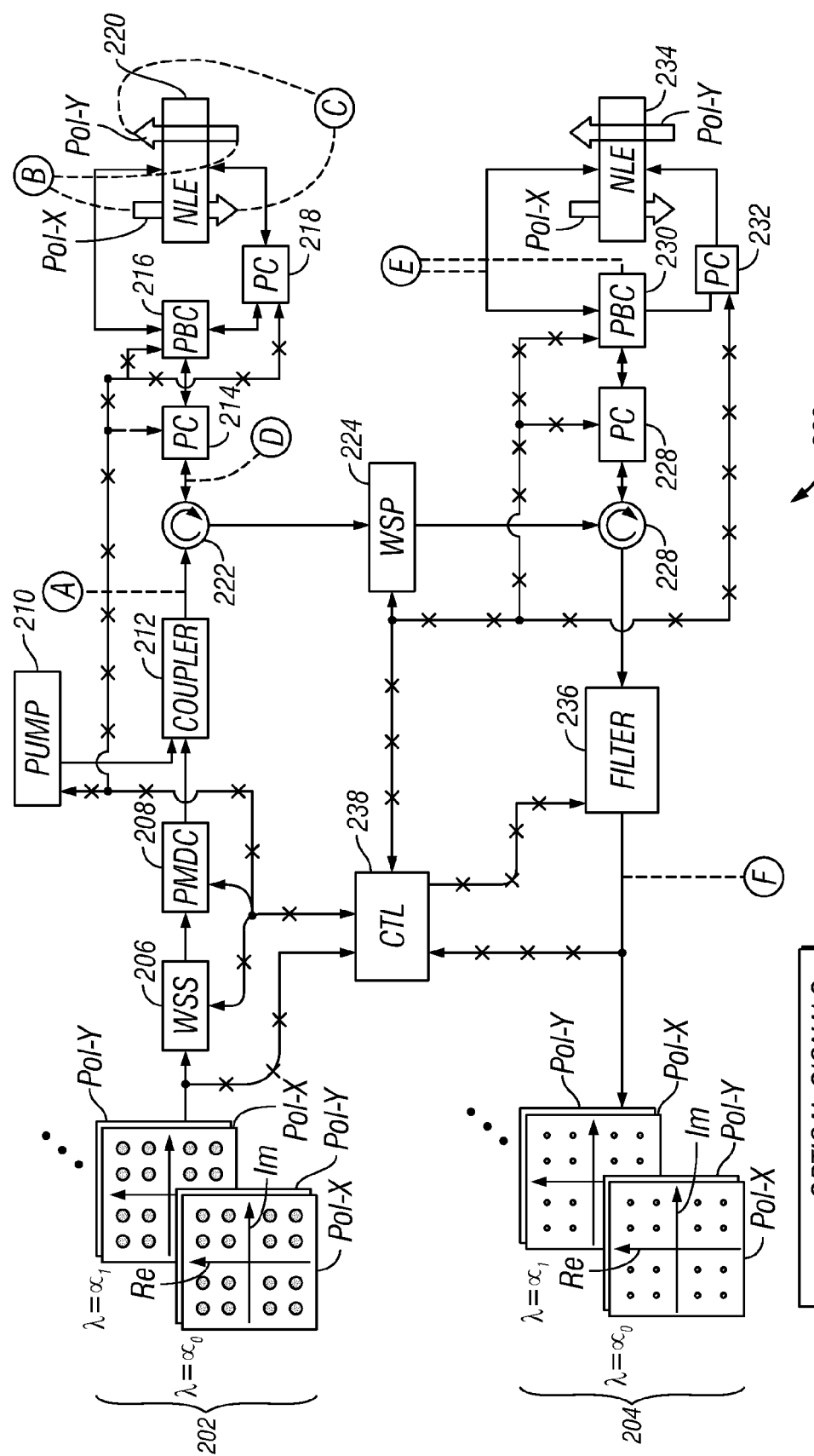
FIG. 2 is an illustration of an example embodiment of a system with an optical amplifier for conducting optical phase-sensitive amplification.

Optical amplifier 102 may include any suitable number and kind of components configured to perform optical signal amplification as described herein. Example implementations of all or part of optical amplifier 102 may include amplifiers 200, 500, and 800 as shown in FIGS. 2, 5, and 8, respectively, and as shown in operation in FIGS. 3-4, 6-7, and 9-10, respectively. Optical amplifier 102 may include a processor 104 coupled to a memory 106. In one embodiment, to perform optical signal amplification, optical amplifier 102 may include components for configuring optical amplifier 102 to monitor, adjust, and pre-compensate input signals and other system characteristics such as pump signal to adjust signal information such as phase, power and chromatic dispersion. In another embodiment, to perform optical signal amplification, optical amplifier 102 may include components for performing one-pump optical four-wave mixing. In a further embodiment, such four-wave mixing may be accomplished by passing the input signal, or filtered portions thereof, bi-directionally through a non-linear optical element. In yet another further embodiment, passing such signals bi-directionally may include separately and simultaneously processing the input signal's polarization components in each such direction by passing an x-polarization component signal in a given direction through the non-linear optical element and a y-polarization component signal in the opposite direction through the non-linear element.

Optical amplifier 102 may be configured to utilize two optical processing stages. In a first stage, optical amplifier 102 may be configured to generate a conjugate signal of input signal 110. In a second stage, optical amplifier 102 may be configured to conduct phase-sensitive non-degenerate four-wave mixing ("FWM"). Such FWM may transfer the energy from the pump signal to the input signal 110 and to its conjugate idler signals.

Specifically, optical amplifier 102 may generate pump laser signals, which may be used to create idler signals that are then added to the input signal. The idler signals may include conjugate signals to input signal 110. The resulting input signal and idler signals might not become degenerate after wave mixing, and thus the amplification may include non-degenerate phase-sensitive amplification. Optical amplifier 102 may be configured to conduct FWM that amplifies input signal 110 and based on the symmetric idler signals. The wavelengths of input signal 110 and idler signals may be equidistant (or nearly equidistant) from the wavelength of the pump signal. The equidistant or nearly equidistant wavelengths may include wavelengths that are, for example, perfectly equidistant or approximately equidistant such that overall performance may not be impacted significantly. Such approximately equidistant wavelengths may include wavelength differences between the idler signals and pump signal that are approximately equal, or wavelength differences between the pump signal and input signal 110 that are approximately equal. In one embodiment, approximately equal wavelength differences may include wavelength differences that vary less than ten percent between the wavelength differences. Idler signals may include a phase that may be the inverse of the phase of input signal 110.

Input signal 110 may include an optical signal modulated through any suitable method, such as m-QAM or m-PSK. Input signal 110 may include dual-polarization components. Optical amplifier 102 may be configured to accept dual-polarization signals in any suitable manner. Optical amplifier 102 may be configured to split input signal 110 into x-polarization and y-polarization components. Such split components may be processed independently. In one embodiment, a single non-linear element may be used for bi-directional signal conversion of the x-polarization and y-polarization components. In another embodiment, a single non-linear element may be used for bi-directional non-degenerate FWM for phase-sensitive amplification of the x-polarization and y-polarization components. In yet another embodiment, the x-polarization and y-polarization components may share the elements of the first and second stages, wherein crosstalk and path mismatch are avoided between the two polarizations.

Optical amplifier 102 may include performance monitoring and wavelength selective processors to dynamically control the operation of optical amplifier 102. Information regarding input signal 110, such as wavelength, power, residual chromatic dispersion, and optical signal-to-noise ratio ("OSNR") may be monitored. Furthermore, information regarding the operation and output of the components of optical amplifier 102 may be monitored. According to monitored information, phase and power levels of various portions of optical amplifier 102 may be dynamically changed, such as the phase and power levels of the input signal, pump signal, and conjugate signals.

Optical amplifier 102 may be configured to accept wavelength division multiplexing ("WDM") signals. The first stage of optical amplifier 102 may be configured to generate idler signals for each WDM component of input signal 110. Furthermore, the second stage of optical amplifier 102 may be configured to perform FWM for each pair of signals within input signal 110 and its idler signal counterpart generated from the first stage. When WDM signals are used in optical amplifier, each idler signal may be equidistant (or nearly equidistant) from the pump signal as its input signal 110 counterpart.

Processor 104 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 104 may interpret and/or execute program instructions and/or process data stored in memory 106 to carry out some or all of the operation of optical amplifier 102. Memory 106 may be configured in part or whole as application memory, system memory, or both. Memory 106 may include any system, device, or apparatus configured to hold and/or house one or more memory modules. Each memory module may include any system, device or apparatus configured to retain program instructions and/or data for a period of time (e.g., computer-readable media). Memory 106 may be non-transitory. One or more portions or functionality of optical amplifier 102 may be implemented by the execution of instructions resident within memory 106 by processor 104.

Optical network 108 may include one or more optical fibers 112 operable to transport one or more optical signals communicated by components of the optical network 108. Optical network 108 may be, for example, a point-to-point optical network with terminal nodes, a ring optical network, a mesh optical network, or any other suitable optical network or combination of optical networks. Optical network 108 may be used in a short-haul metropolitan network, a long-haul inter-city network, or any other suitable network or combination of networks. The capacity of optical network 108 may include, for example, 100 Gbit/s, 400 Gbit/s, or 1 Tbit/s. Optical fibers 112 may include any suitable type of fiber, such as a Single-Mode Fiber ("SMF"), Enhanced Large Effective Area Fiber ("E-LEAF"), or TrueWave® Reduced Slope ("TW-RS") fiber. Optical network 108 may include devices, such as optical amplifier 102, operable to transmit optical signals over optical fibers 112. Information may be transmitted and received through optical network 108 by modulation of one or more wavelengths of light to encode the information on the wavelength.

In operation, optical amplifier 102 may be operating on optical network 108. Input signal 110 may arrive on optical network 108 through fibers 112. Optical amplifier may amplify input signal 110 and output the result as output signal 114.

FIG. 2 is an illustration of an example embodiment of an optical amplifier 200 for conducting optical phase-sensitive amplification. In one embodiment, optical amplifier 200 may be configured to support dual-polarization modulation formats. Optical amplifier 200 may implement fully or in part optical amplifier 102 of FIG. 1.

Optical amplifier 200 may include a mechanism for accepting an input signal such as input signal 202. Input signal 202 may include a plurality of WDM channels. Each such channel may correspond to a different wavelength. Furthermore, each such channel may correspond to a different modulation format. Such a wavelength may be denoted by $\alpha_i$. For each such channel, input signal 202 may include an x-polarization and a y-polarization component. Input signal 202 may implement input signal 110 of FIG. 1. Input signal 202 may be communicatively coupled to wavelength selective switch 206. Wavelength selective switch 206 may be configured to select what portions of input signal 202 are to be amplified with optical amplifier 200. Wavelength selective switch 206 may thus be configured to select the desired channels of input signal 202 to be processed on, for example, a per-wavelength basis. Such switching may be performed to select what portions of input signal 202 that are to be amplified. Wavelength selective switch 206 may be implemented in any suitable manner, such as by active or passive configurable filters, array waveguides, electromechanical devices, or crystals. Wavelength selective switch 206 may be communicatively coupled to control module 238. Control module 238 may be configured to adjust the operation of wavelength selective switch 206 to, for example, select what portion of input signal 202 is to be amplified by optical amplifier 200. Such adjustments may be based upon, for example, the nature or kind of input signal 202, detected output of optical amplifier 200, or detected output of wavelength selective switch 206.

Wavelength selective switch 206 may be communicatively coupled to polarization-mode dispersion compensator 208. Polarization-mode dispersion compensator 208 may be configured to compensate for residual polarization-mode dispersion in input signal 202. Polarization-mode dispersion compensator 208 may be implemented in any suitable manner, such as a module, optical device, or electronic device. Polarization-mode dispersion compensator 208 may be communicatively coupled to control module 238. Control module 238 may be configured to adjust the operation of polarization-mode dispersion compensator. Such adjustments may be based upon, for example, the nature or kind of input signal 202, detected output of optical amplifier 200, or detected output of polarization-mode dispersion compensator 208.

Optical amplifier 200 may include a first stage configured to perform signal conversion to generate a conjugate signal of input signal 202. In addition, optical amplifier 200 may include a second stage configured to conduct phase-sensitive non-degenerate FWM. Such non-degenerate FWM may be performed upon input signal 202 and the conjugate signal.

The first stage of optical amplifier 200 configured to generate a conjugate signal of input signal 202 may include a pump 210, coupler 212, optical circulator 222, polarization controller 214, polarization beam controller 216, polarization controller 218, and non-linear element 220.

Pump 210 may be configured to provide a pump signal with a wavelength and strength that may be set in relation to the wavelength of input signal 202 that is to be amplified. The output of polarization-mode dispersion compensator 208 may be communicatively coupled to coupler 212, along with the output of pump 210. Pump 210 may be implemented in any suitable manner for providing an appropriate pump signal in optical amplifier 200, such as by a configurable laser source. Pump 210 may be communicatively coupled to control module 238. Control module 238 may be configured to adjust the wavelength, power, phase, or other aspects of the operation of pump 210. Such adjustments may be based upon, for example, the nature or kind of input signal 202, detected output of pump 210, or detected output of optical amplifier 200.

Coupler 212 may be configured to couple the output of polarization-mode dispersion compensator 208 (including input signal 202 compensated for polarization-mode dispersion) and the output of pump 210. Coupler 212 may be communicatively coupled to optical circulator 222 and configured to provide its output thereto. Coupler 212 may be implemented in any suitable manner for coupling the inputs as described.

Optical circulator 222 may be communicatively coupled on a first input/output line to polarization controller 214 and on a second input/output line to a second stage of optical amplifier 200, which may include a wavelength selective processor 224. Optical circulator 222 may be communicatively coupled on an input line to coupler 212 and configured to receive its output. Optical circulator 222 may include any suitable mechanism for selective routing of inputs and outputs according to the present disclosure. For example, optical circulator 222 may include a plurality of sequentially identified optical input-output ports and may allow light to travel in only one direction. An optical signal entered into a first port will exit the second port, while a signal entering the second port will exit the third port. The sequential identification of the first, second, and third port, and thus the input-output behavior, may be schematically identified with a clockwise or counter-clockwise indicator. In the example of FIG. 2, optical circulator 222 may operate in clockwise fashion such that the input from coupler 212 is output to polarization controller 214, and input from polarization controller 214 may be output to wavelength selective processor 224.

Polarization controllers 214, 218 may be configured to adjust the x-polarization and y-polarization components of its input signals with respect to polarization beam controller 216 to maximize or increase the effects of conjugate signal generation as performed by, for example, non-linear element 220. Such adjustments may include a polarization shifting of the x-polarization and y-polarization components. Furthermore, polarization controllers 214, 218 may be configured to adjust such components after a conjugate signal has been generated for the components. Polarization controllers 214, 218 may be implemented in any suitable manner to perform such adjustments. Polarization controllers 214, 218 may be communicatively coupled to control module 238. Control module 238 may be configured to adjust the operation of polarization controllers 214, 218. Such adjustments may be based upon, for example, the nature or kind of input signal 202, detected output of polarization controllers 214, 218, or detected output of optical amplifier 200.

Polarization controller 214 may be configured to receive its input from optical circulator 222, perform adjustments on the x-polarization and y-polarization components if necessary, and output the results to polarization beam controller 216.

Polarization beam controller 216 may be configured to split an input signal according to x-polarization and y-polarization components, and to combine x-polarization and y-polarization components that were previously split. For example, input signal 202 may include an x-polarization component and a y-polarization component. Thus, polarization beam controller 216 may be configured to output the x-polarization component of the combination of input signal 202 and the pump signal and to output the y-polarization component of the combination input signal 202 and the pump signal. Polarization beam controller 216 may be configured to output each polarization bi-directionally to the same non-linear element 220 for signal conversion. For example, the x-polarization component may be provided to non-linear element 220 in the clockwise circuit loop in FIG. 2 and the y-polarization component may be provided to non-linear element 220 in the counter-clockwise circuit loop in FIG. 2. Polarization beam controller 216 may be implemented in any suitable manner for splitting its input signals into x-polarization and y-polarization components. Polarization beam controller 216 may be communicatively coupled to control module 238. Control module 238 may be configured to adjust the operation of polarization beam controller 216. Such adjustments may be based upon, for example, the nature or kind of input signal 202, detected output of optical amplifier 200, or detected output of polarization beam controller 216.

Polarization controller 218 may be configured to receive its input from polarization beam controller 214 or non-linear element 220 and, if necessary, adjust the polarization components of its inputs and output the result to non-linear element 220 or polarization beam controller 214, respectively. Further, polarization beam controller 216 may be configured to combine the x-polarization and y-polarization components as they are received after passing bi-directionally through non-linear element 220. Polarization beam controller 216 may receive the x-polarization input from polarization controller 218. Furthermore, polarization beam controller 216 may output the combination of the x-polarization and y-polarization to polarization controller 214 and on to optical circulator 222.

Non-linear element 220 may be configured to bi-directionally provide signal conversion for signals passing through either end of non-linear element 218. Non-linear element 220 may include an optical non-linear element. Such signal conversion may be performed on signals passing simultaneously through optical non-linear element 220 in each direction, such as x-polarization and y-polarization components from polarization beam controller 216. In one embodiment, any non-linear element that can support bi-directional propagation and non-linear processing may be used to implement non-linear element 220. For example, non-linear element 220 may include an optical, highly non-linear fiber ("HNLF") of length of two hundred meters, non-linear coefficient ($\gamma$=9.2 (1/W·km)), dispersion slope (S=0.018 ps/km/nm$^2$), and zero-dispersion wavelength ("ZDW") at 1550 nm. In another example, non-linear element 220 may include waveguides configured to produce the desired output. In yet other examples, non-linear element 220 may include a silicon waveguide, III-V waveguide, or periodically poled Lithium Niobate ("PPLN").

Non-linear element 220 may be configured to provide signal conversion based upon the nature of its input signals, which may include the combination of input signal 202 and pump signal from pump 210. In one embodiment, non-linear element 220 may be configured to cause an idler signal to be added to the combination of input signal 202 and the pump signal. In a further embodiment, the idler signal and input signal 202 may be equidistant, or nearly equidistant, from the pump signal. Thus, the idler signal and input signal 202 may be symmetrically, or nearly symmetrically, located on each side of the pump signal. In another embodiment, the generated idler signal may include the inverse phase as input signal 202. If input signal 202 includes multiple WDM components, non-linear element may generate an idler signal for each such WDM component. Each idler signal and the corresponding WDM component may be equidistant, or nearly equidistant, from the pump signal in terms of wavelength. Thus, the WDM components of input signal 202 and the corresponding idler signals may be symmetric, or nearly symmetric, around the pump signal.

By performing separate processing of x-polarization and y-polarization components, optical amplifier 200 may avoid crosstalk or path mismatch between the components. Further, by performing the processing bi-directionally, optical amplifier 200 may achieve hardware efficiency by lessening the need for additional optical non-linear elements.

The second stage of optical amplifier 200 configured to perform FWM on the combination of input signal 202, pump signal, and idler signal may include a wavelength selective processor 224, optical circulator 226, polarization controllers 228, 232, polarization beam controller 230, and non-linear element 234.

Wavelength selective processor 224 may be configured to receive a signal from the first stage of optical amplifier 200. Such reception may be made from, for example, optical circulator 222. The received signal may include a combination of input signal 202, pump signal, and idler signals. Wavelength selective processor 224 may be configured to select which portions of the received signal are to be amplified using FWM. Such selection may be made based on, for example, wavelength. For example, generation of idler signals in conjunction with non-linear element 220 may have caused unnecessary or unused idler signals for the purposes of amplification. Thus, wavelength selective processor 224 may be configured to filter out these unused idler signals. Wavelength selective processor 224 may be implemented in any suitable manner to perform optical switching according to the present disclosure. For example, wavelength selective processor 224 may include one or more wavelength selective switches implemented by any suitable mechanism, including optical components. Furthermore, wavelength selective processor 224 may include modules, circuitry, or software configured to adjust phase and power levels of components of signals. For example, the phases of input signal 202, the pump signal, and the idler signal may be adjusted to facilitate FWM. In addition, wavelength selective processor 224 may include automation software configured to control the operation of wavelength selective switches. Any suitable automation software may be used. The automation software may include instructions resident upon a computer-readable medium for execution by a processor. Wavelength selective processor 224 may include a microprocessor, microcontroller, DSP, ASIC, or any other digital or analog circuitry for executing the instructions resident upon a computer-readable medium or for otherwise performing control of wavelength selective switches. Wavelength selective processor 224 may be communicatively coupled to control module 238. Control module 238 may be configured to adjust the operation of wavelength selective processor 224, such as adjustment of power or phases of signals received by wavelength selective processor 224, or adjustment of signals that will be filtered by wavelength selective processor 224. Furthermore, wavelength selective processor 224 may be adjusted to pre-compensate its input signals for the input signals' residual chromatic dispersion or for dispersion slope of HNLF resident within non-linear elements. Such adjustments may be based upon, for example, the nature or kind of input signal 202, detected output of wavelength selective processor 224, or detected output of optical amplifier 200.

If input signal 202 includes WDM signals, wavelength selective processor 224 may be configured to select a range including the WDM signals to be amplified, the pump signal, and the range of idler signals corresponding to each of the WDM signals.

Wavelength selective processor 224 may be configured to output its results to optical circulator 226. Optical circulator 226 may be implemented in similar fashion as optical circulator 222, as discussed above. Optical circulator 226 may be configured to route input from wavelength selective processor 224 to polarization controller 228. Furthermore, optical circular 226 may be configured to route input polarization controller 228 to filter 236.

Polarization controllers 228, 232 may be implemented in similar fashion to polarization controllers 214, 218 as described above. Polarization controllers 228, 232 may be communicatively coupled to control module 238. Control module 238 may be configured to adjust the operation of polarization controllers 228, 232. Such adjustments may be based upon, for example, the nature or kind of input signal 202, detected output of polarization controllers 228, 232, or detected output of optical amplifier 200.

Polarization controller 228 may be communicatively coupled to optical circulator 226 and polarization beam controller 230. Polarization controller 228 may adjust x-polarization or y-polarization components in signals received from optical circulator 226 and send the result to polarization beam controller 230. Furthermore, polarization controller 228 may adjust x-polarization or y-polarization components in signals received from polarization beam controller 230 and send the result to optical circulator 226.

Polarization beam controller 230 may be implemented in similar fashion to polarization beam controller 216, as described above. Polarization beam controller 230 may be communicatively coupled to two ends of non-linear element 234. Polarization beam controller 230 may be configured to output the x-polarization of the output of wavelength selective processor 224 (which may be processed by polarization controller 228) to one end of non-linear element 234 and output the y-polarization of the output of wavelength selective processor 224 to another end of non-linear element 234. Thus, polarization beam controller 230 may be configured to output each polarization bi-directionally to the same non-linear element 234 for signal amplification. Polarization beam controller 230 may be communicatively coupled to control module 238. Control module 238 may be configured to adjust the operation of polarization beam controller 230. Such adjustments may be based upon, for example, the nature or kind of input signal 202, detected output of optical amplifier 200, or detected output of polarization beam controller 230.

Polarization controller 232 may be configured to receive its input from polarization beam controller 230 or non-linear element 234 and, if necessary, adjust the polarization components of its inputs and output the result to non-linear element 234 or polarization beam controller 230, respectively. Further, polarization beam controller 230 may be configured to combine the x-polarization and y-polarization components as they are received after passing bi-directionally through non-linear element 234. Polarization beam controller 230 may receive the x-polarization input from polarization controller 232. Furthermore, polarization beam controller 230 may output the combination of the x-polarization and y-polarization to polarization controller 228 and on to optical circulator 232.

Non-linear element 234 may be configured to bi-directionally amplify and amplify signals passing through either end of non-linear element 234 using FWM. Such signals may include both input signal 202 and its idler signals. In one embodiment, non-linear element 234 may perform non-degenerate FWM. Such bi-directional amplification may be performed on signals passing simultaneously through non-linear element 234 in each direction. In one embodiment, any non-linear element that can support bi-directional propagation and non-linear processing may be used to implement non-linear element 234. For example, non-linear element 234 may include an optical, highly non-linear fiber ("HNLF") of length of two hundred meters, non-linear coefficient ($\gamma$=9.2 (1/W·km)), dispersion slope (S=0.018 ps/km/nm$^2$), and zero-dispersion wavelength ("ZDW") at 1550 nm. In another example, non-linear element 234 may include waveguides configured to produce the desired output. In yet other examples, non-linear element 234 may include a silicon waveguide, III-V waveguide, or periodically poled Lithium Niobate ("PPLN").

The combination of polarization beam controller 230 and non-linear element 234 may be bi-directional in that signals pass from polarization beam controller 230 to non-linear element 234 and back to polarization beam controller 230 in both directions (clockwise and counter-clockwise). By performing separate processing of x-polarization and y-polarization components, optical amplifier 200 may avoid crosstalk or path mismatch between the components. Further, by performing the processing bi-directionally, optical amplifier 200 may achieve hardware efficiency by lessening the need for additional non-linear elements.

The FWM performed by non-linear element 234 may utilize the equidistant, or nearly equidistant, arrangement of input signal 202 and its idler signals around the pump signal. Furthermore, the FWM performed by non-linear element 234 may utilize the performance of the idler signals as conjugate signals to input signal 202.

If input signal 202 includes WDM signals, non-linear element 234 may amplify the range of WDM signals and the range of the idler signals corresponding to the WDM signals.

Optical amplifier 200 may include a filter 236 configured to remove the idler signals and pump signal from the result of FWM. Filter 236 may include a bandpass filter. Filter 236 may be communicatively coupled to optical circulator 226. Furthermore, filter 236 may be configured to only allow signals with the wavelength of the original input signal (input signal 202) to pass. Filter 236 may be implemented in any suitable manner, such as with digital or analog circuitry. Filter 236 may be configured to generate output signal 204. The result of optical amplification in output signal 204 may implement output signal 114 of FIG. 1.

Filter 236 may be communicatively coupled to control module 238. Control module 238 may be configured to adjust the operation of filter 236. Such adjustments may be based upon, for example, the nature or kind of input signal 202, detected output of optical amplifier 200, or detected output of filter 236.

Control module 238 may be configured to monitor performance of optical amplifier 200 and its signals. Such monitoring may be conducted in real-time and may include, for example, information regarding input signal 202, output signal 204, wavelength selective switch 206, polarization-mode dispersion compensator 208, pump 210, polarization controllers 214, 218, 228, 232, polarization beam controllers 216, 230, wavelength selective processor 224, and filter 236. Such information may include, for example, wavelength, power, residual chromatic dispersion, and optical signal-to-noise ratio. Based on such information, control module 238 may be configured to adjust or control the operation of various portions of optical amplifier 200 to enhance or optimize performance of optical amplifier 200. Such portions may include, for example, wavelength selective switch 206, polarization-mode dispersion compensator 208, pump 210, polarization controllers 214, 218, 228, 232, polarization beam controllers 216, 230, wavelength selective processor 224, and filter 236.

In operation, input signal 202 may be received by optical amplifier 200 and filtered by wavelength selective switch 206. The signal may be compensated for dispersion by polarization-mode dispersion compensator 208. The output of polarization-mode dispersion compensator 208 may be communicatively coupled to the output of pump 210 by coupler 212.

In a first stage of optical amplifier 200, signal conversion may be performed on the combination of the pump signal and input signal 202 to yield an idler signal. The resultant combination of input signal 202 and the signal of pump 210 may be routed by optical circulator 222 to polarization controller 214. Polarization controller 214 may adjust the polarization components and send the results to polarization beam controller 216. Polarization beam controller 216 may split its input into x-polarization and y-polarization components. The x-polarization component may be routed clockwise to non-linear element 220 and the y-polarization component may be routed counter-clockwise to non-linear component 220. Polarization controller 218 may adjust the polarization components and send the results to non-linear element 220. Non-linear element 220 may simultaneously perform signal conversion on the x-polarization component and the y-polarization component. The signal conversion may yield an idler signal added to the combination of the pump signal and input signal 202. The idler signal and input signal 202 may be equidistant, or nearly equidistant, from the pump signal in terms of wavelength. The x-polarization component may be routed to polarization controller 218, which may adjust the polarization component and route the result to polarization beam controller 216. The y-polarization component may be routed counter-clockwise to polarization beam controller 216. Polarization beam controller 216 may combine the x-polarization and the y-polarization components and route the result to optical circulator 222, which may in turn route the result to wavelength selective processor 224.

In a second stage of optical amplifier 200, non-degenerate phase-sensitive amplification may be performed on the combination of pump signal 210, input signal 202, and idler signal generated by the first stage. Wavelength selective processor 224 may pre-compensate its input signals for the signals' residual chromatic dispersion, pre-compensate its input signals for the dispersion slope of any HNLF or other components of non-linear element 234, or adjust its input signals' phase levels in order to maximize or optimize amplification. Wavelength selective processor 224 may select or filter which portions of the combination of the pump signal, input signal 202, and idler signal will be amplified. The results may be routed to polarization controller 228, which may adjust the polarization components and route the result to polarization beam controller 230. Polarization beam controller 230 may split its input into x-polarization and y-polarization components. Polarization beam controller 230 may route the y-polarization component counter-clockwise through polarization controller 232, which may adjust the component, to non-linear element 234. Furthermore, polarization beam controller 230 may route the x-polarization component clockwise to non-linear element 234. Non-linear element 234 may perform phase-sensitive non-degenerate FWM upon the x-polarization and y-polarization components simultaneously. The result of the FWM may be to amplify input signal 202 and the corresponding idler signal. Non-linear element 234 may send the amplified y-polarization component counter-clockwise to polarization beam controller 230 and send the amplified x-polarization component clockwise to polarization beam controller 230. The x-polarization component may be adjusted by polarization controller 232. Polarization beam controller 230 may combine the x-polarization and y-polarization components and send the result to polarization controller 228. Polarization controller 228 may route the result to filter 236 through optical circulator 226. Filter 236 may remove all portions of the signal other than those wavelengths originally present in input signal 202. For example, the pump signal and idler signals may be removed. Filter 236 may output the result as output signal 204.

Control module 238 may continuously monitor performance of optical amplifier 200 and its signals and adjust various components of optical amplifier 200 in real-time. Control module 238 may monitor information regarding input signal 202, output signal 204, wavelength selective switch 206, polarization-mode dispersion compensator 208, pump 210, polarization controllers 214, 218, 228, 232, polarization beam controllers 216, 230, wavelength selective processor 224, and filter 236. Control module 238 may adjust or control the operation of various portions of optical amplifier 200 to enhance or optimize performance of optical amplifier 200, such as wavelength selective switch 206, polarization-mode dispersion compensator 208, pump 210, polarization controllers 214, 218, 228, 232, polarization beam controllers 216, 230, wavelength selective processor 224, and filter 236. Adjustments may be made to match the nature, modulation format, polarization, frequency, or other aspects of input signal 202, or to optimize or increase amplification.

Figure 3A:
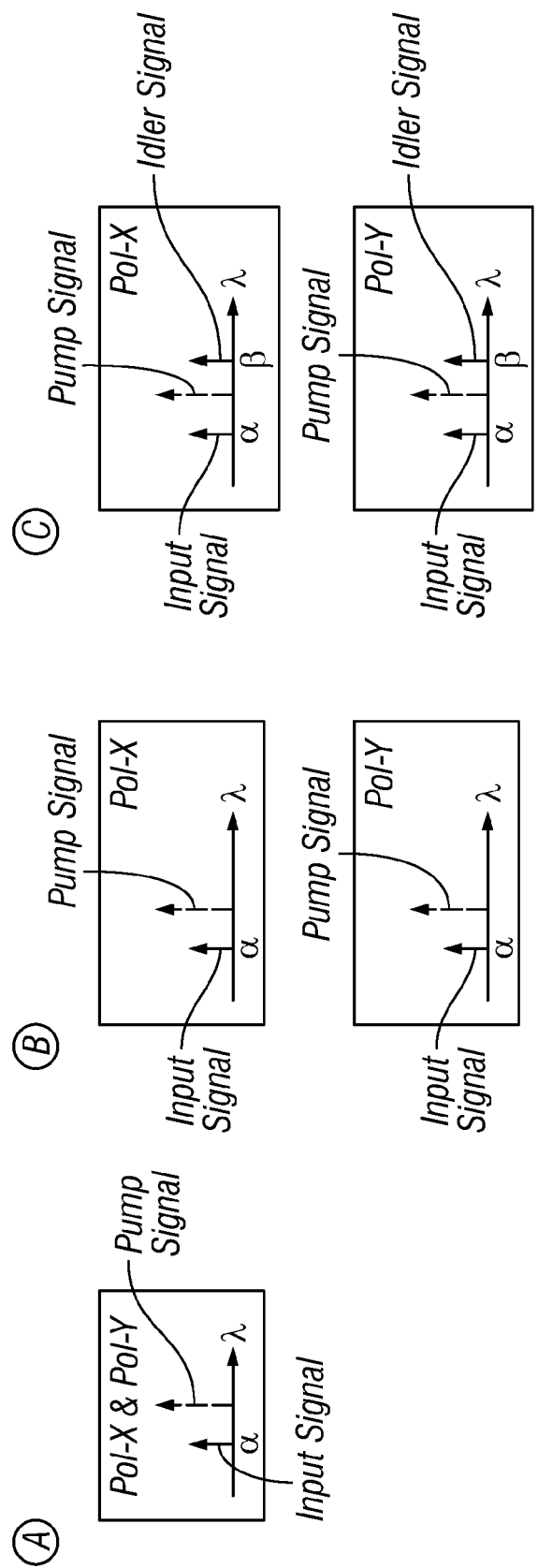
FIGS. 3A and 3B are an illustration of the operation of an example embodiment of an optical amplifier for conducting optical phase-sensitive amplification on a single channel.
Figure 3B:
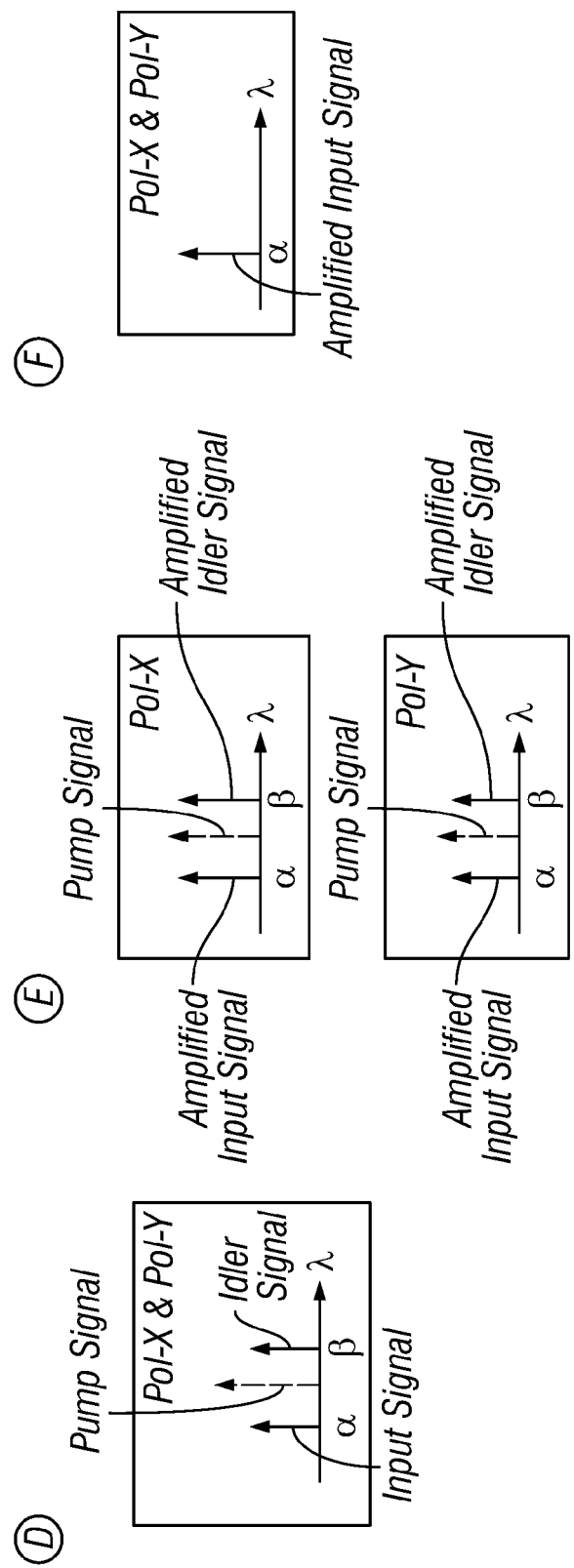

FIGS. 3A and 3B are an illustration of the operation of optical amplifier 200 for conducting optical phase-sensitive amplification, which may include amplification of dual polarization input signals. FIGS. 3A and 3B illustrate the status of signals at various reference points in optical amplifier 200 as illustrated in FIG. 2.

At (A), a degraded input signal 202 and the output of pump 210 may have been combined. Both polarizations are shown in combination. Input signal 202 may be separated from the pump signal by a wavelength distance $\alpha$.

At (B), the combined input signal 202 and pump signal may have been divided into x-polarization and y-polarization components by polarization beam controller 216. The signals may be prepared to be sent through non-linear element 220 bi-directionally for signal conversion.

At (C), an idler signal has been added to the x-polarization and y-polarization components of the combined signals as a result of bi-directionally passing through non-linear element 220. The idler signal may be separated from the pump signal by a wavelength distance $\beta$. The wavelength distances $\alpha$ and $\beta$ may be equal, or nearly equal.

At (D), the x-polarization and y-polarization components of the combined signals may have been recombined into a single signal set by polarization beam controller 216.

At (E), the x-polarization and y-polarization components of the combined signals may have been separated by polarization beam controller 230. Furthermore, each of the x-polarization and y-polarization components of the combined signals may have been passed bi-directionally through non-linear element 234 to perform non-degenerate FWM to cause phase-sensitive amplification. As a result, input signal 202 and the idler signal may have been amplified.

At (F), the x-polarization and y-polarization components of the combined signals may have been recombined by polarization beam controller 230. Furthermore, the resultant signal set may have been filtered by filter 236 to remove the idler signal and the pump signal, leaving only the amplified version of input signal 202, which may be output signal 204.

Figure 4A:
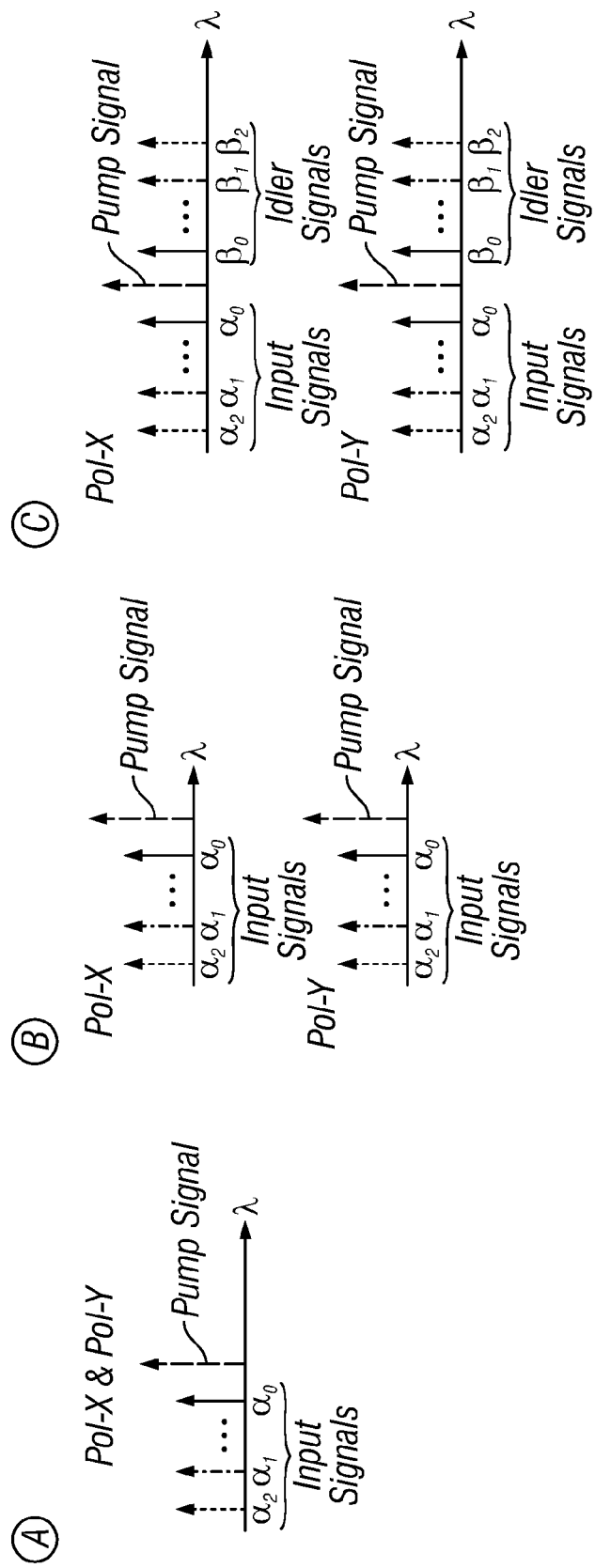
FIGS. 4A and 4B are an illustration of the operation of an example embodiment of an optical amplifier for conducting optical phase-sensitive amplification on wavelength division multiplexing (WDM) channels.
Figure 4B:
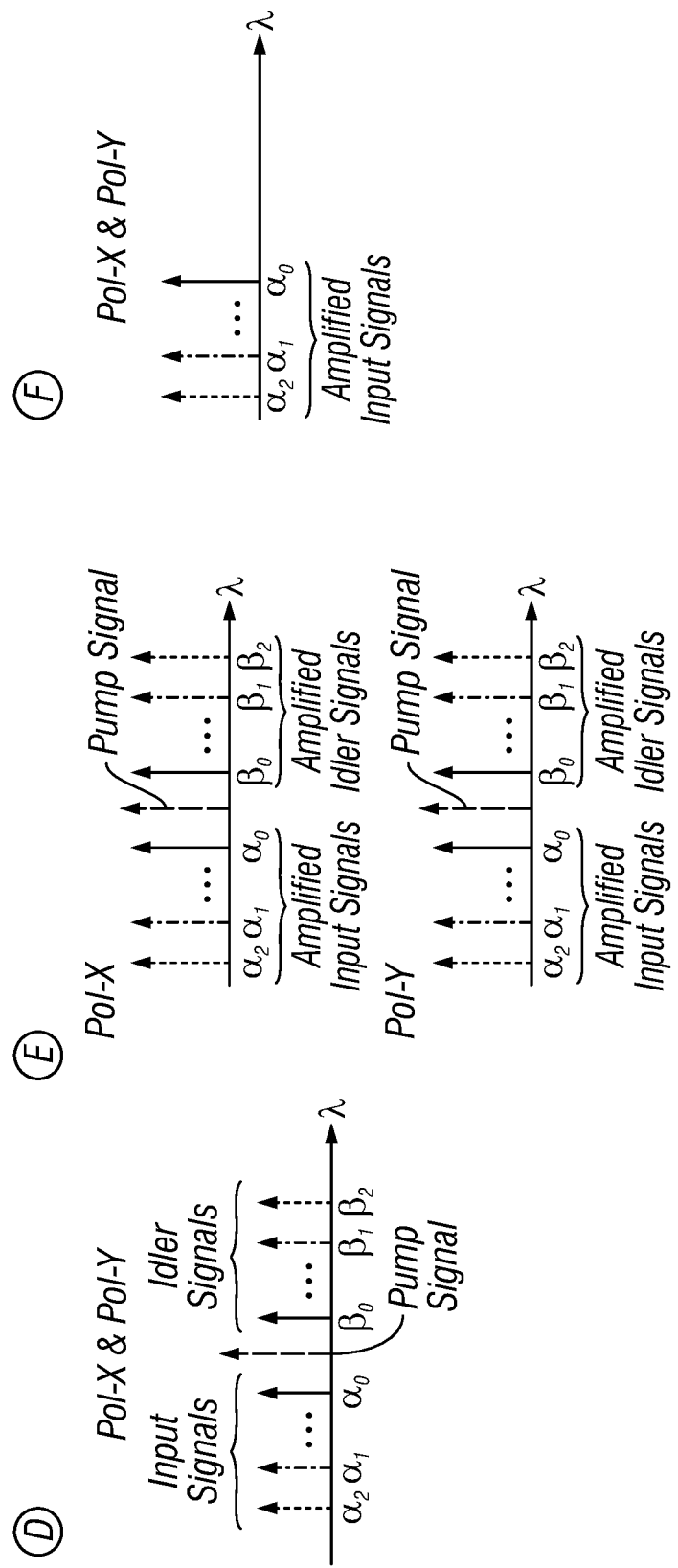
Figure 5:
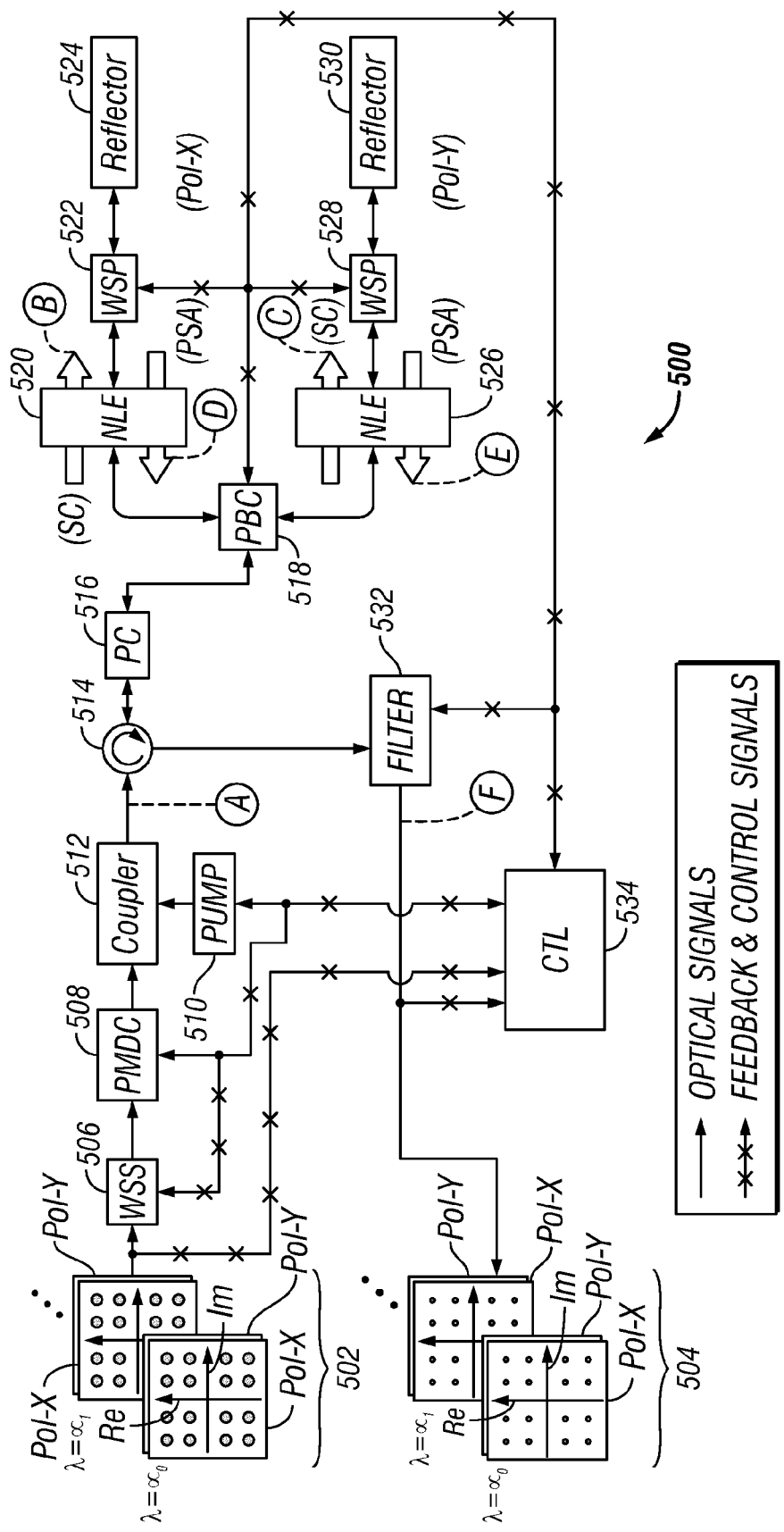
FIG. 5 is an illustration of an another example embodiment of system with an optical amplifier for conducting optical phase-sensitive amplification.

FIGS. 4A and 4B are an illustration of the operation of optical amplifier 200 for conducting optical phase-sensitive amplification using WDM, which may include amplification of dual-polarization signals. FIGS. 4A and 4B illustrate the status of signals at various reference points in optical amplifier 200 as illustrated in FIG. 2.

At (A), a degraded set of WDM signals of input signal 202 and the output of pump 210 may have been combined. Both polarizations are shown in combination. Each of the WDM signals of input signal 202 may each be separated from the pump signal by a wavelength distance, such as $\alpha_0$, $\alpha_1$, and $\alpha_2$, respectively. In one embodiment, each wavelength distance may be a multiple of another wavelength distance.

At (B), a combined input signal 202 and pump signal may have been divided into x-polarization and y-polarization components by polarization beam controller 216. The signals may be prepared to be sent through non-linear element 220 bi-directionally for signal conversion.

At (C), a set of idler signals has been added to the x-polarization and y-polarization components of the combined signals as a result of bi-directionally passing through non-linear element 220. Each of the idler signals illustrated may correspond to a WDM component of input signal 202. Each of the idler signals may be separated from the pump signal by a wavelength distance such as $\beta_0$, $\beta_1$, and $\beta_2$, respectively. The wavelength distances $\alpha_i$ and $\beta_i$ may be equal, or nearly equal.

At (D), the x-polarization and y-polarization components of the combined signals may have been recombined into a single signal set by polarization beam controller 216.

At (E), the x-polarization and y-polarization components of the combined signals may have been separated by polarization beam controller 230. Furthermore, each of the x-polarization and y-polarization components of the combined signals may have been passed bi-directionally through non-linear element 234 to perform non-degenerate FWM to cause phase-sensitive amplification. As a result, each WDM component of input signal 202 and the corresponding idler signals may have been amplified.

At (F), the x-polarization and y-polarization components of the combined signals may have been recombined by polarization beam controller 230. Furthermore, the resultant signal set may have been filtered by filter 236 to remove the set of idler signals and the pump signal, leaving only the amplified version of the WDM components of input signal 202, which may be output signal 204.

FIG. 5 is an illustration of an example embodiment of an optical amplifier 500 for conducting optical phase-sensitive amplification. In one embodiment, optical amplifier 500 may be configured to support dual-polarization modulation formats. Optical amplifier 500 may implement fully or in part optical amplifier 102 of FIG. 1.

Optical amplifier 500 may include a mechanism for accepting an input signal such as input signal 502. Input signal 502 may include a plurality of WDM channels. Each such channel may correspond to a different wavelength. Such a wavelength may be denoted by $\alpha_i$. For each such channel, input signal 502 may include an x-polarization and a y-polarization component. Input signal 502 may implement input signal 110 of FIG. 1. Input signal 502 may be communicatively coupled to wavelength selective switch 506. Wavelength selective switch 506 may be implemented in a similar manner to wavelength selective switch 206 of FIG. 2, and may be configured to select what portions of input signal 502 are to be amplified with optical amplifier 500, perform wavelength demultiplexing, and switch signals on a per-wavelength basis. Wavelength selective switch 506 may be communicatively coupled to control module 534. Control module 534 may be configured to adjust the operation of wavelength selective switch 506 to, for example, select what portion of input signal 502 is to be amplified by optical amplifier 500. Such adjustments may be based upon, for example, the nature or kind of input signal 502, detected output of optical amplifier 500, or detected output of wavelength selective switch 506.

Wavelength selective switch 506 may be communicatively coupled to polarization-mode dispersion compensator 508. Polarization-mode dispersion compensator 508 may be implemented in a similar manner as polarization-mode dispersion compensator 208 of FIG. 2, and configured to compensate for residual polarization-mode dispersion in input signal 502. Polarization-mode dispersion compensator 508 may be communicatively coupled to control module 534. Control module 534 may be configured to adjust the operation of polarization-mode dispersion compensator. Such adjustments may be based upon, for example, the nature or kind of input signal 502, detected output of optical amplifier 500, or detected output of polarization-mode dispersion compensator 508.

Optical amplifier 500 may include a first stage configured to perform signal conversion to generate a conjugate signal of input signal 502. In addition, optical amplifier 500 may include a second stage configured to conduct non-degenerate FWM. Such non-degenerate FWM may be performed upon input signal 502 and the conjugate signal.

The first stage of optical amplifier 500 configured to generate a conjugate signal of input signal 502 may include a pump 510, coupler 512, optical circulator 514, polarization controller 516, polarization beam controller 518, and non-linear elements 520, 526.

The second stage of optical amplifier 500 configured to perform non-degenerate FWM for phase-sensitive amplification may include reflectors 524, 530, wavelength selective processors 522, 528, non-linear elements 520, 526, and polarization beam controller 518. Thus, in one embodiment, non-linear elements 520, 526 may be used in both stages of optical amplifier 500.

Pump 510 may be configured and implemented in a similar manner as pump 210 of FIG. 2 by providing a pump signal with a wavelength and strength that is set in relation to the wavelength of input signal 502 that is to be amplified. The output of polarization-mode dispersion compensator 508 may be communicatively coupled to coupler 512, along with the output of pump 510. Pump 510 may be communicatively coupled to control module 534. Control module 534 may be configured to adjust the wavelength, power, phase, or other aspects of the operation of pump 510. Such adjustments may be based upon, for example, the nature or kind of input signal 502, detected output of pump 510, or detected output of optical amplifier 500.

Coupler 512 may be configured to couple the output of polarization-mode dispersion compensator 508 (including input signal 502 compensated for polarization-mode dispersion) and the output of pump 510. Coupler 512 may be communicatively coupled to optical circulator 514 and configured to provide its output thereto. Coupler 512 may be implemented in any suitable manner for coupling the inputs as described.

Optical circulator 514 may be communicatively coupled on a first input/output line to polarization controller 516 and on a second input/output line to filter 532. Optical circulator 514 may be communicatively coupled on an input line to coupler 512 and configured to receive its output. Optical circulator 514 may be implemented in a similar manner as optical circulator 222 of FIG. 2.

Polarization controller 516 may be implemented in a similar manner as polarization controller 214 of FIG. 2. Polarization controller 516 may be configured to adjust the x-polarization and y-polarization components of its input signals to maximize or increase the effects of conjugate signal generation to be performed by, for example, non-linear elements 520, 526. Such adjustments may include a polarization shifting of the x-polarization and y-polarization components. Polarization controller 516 may be communicatively coupled to control module 534. Control module 534 may be configured to adjust the operation of polarization controller 516. Such adjustments may be based upon, for example, the nature or kind of input signal 502, detected output of polarization controller 516, or detected output of optical amplifier 500. Polarization controller 516 may be configured to receive its input from optical circulator 514, perform adjustments on the x-polarization and y-polarization components if necessary, and output the results to polarization beam controller 518.

Polarization beam controller 518 may be implemented in a similar manner as polarization beam controller 216 of FIG. 2. Polarization beam controller 518 may be configured to split an input signal according to x-polarization and y-polarization components and to output each component. Polarization beam controller 518 may be configured to send the x-polarization component to non-linear element 520 and the y-polarization component to non-linear element 526. Polarization beam controller 518 may be communicatively coupled to control module 534. Control module 534 may be configured to adjust the operation of polarization beam controller 518. Such adjustments may be based upon, for example, the nature or kind of input signal 502, detected output of optical amplifier 500, or detected output of polarization beam controller 518.

Each of non-linear element 520 and non-linear element 526 may be implemented in a similar manner to non-linear elements 220, 234 of FIG. 2. Each of non-linear element 520 and non-linear element 526 may be configured to perform signal conversion on a polarization component received from polarization beam controller 518 and to send the result to wavelength selective processors 522, 528, respectively.

Each of non-linear element 520 and non-linear element 526 may be configured to provide signal conversion based upon the nature of its respective input signals, which may include the combination of input signal 502 and pump signal from pump 510. In one embodiment, each of non-linear element 520 and non-linear element 526 may be configured to cause an idler signal to be added to the combination of input signal 502 and the pump signal. In a further embodiment, the idler signal and input signal 502 may be equidistant, or nearly equidistant, from the pump signal. Thus, the idler signal and input signal 502 may be symmetrically, or nearly symmetrically, located on each side of the pump signal. In another embodiment, the generated idler signal may include the inverse phase as input signal 502. If input signal 502 includes multiple WDM components, non-linear element may generate an idler signal for each such WDM component. Each idler signal and the corresponding WDM component may be equidistant, or nearly equidistant, from the pump signal in terms of wavelength. Thus, the WDM components of input signal 502 and the corresponding idler signals may be symmetric, or nearly symmetric, around the pump signal.

By performing separate processing of x-polarization and y-polarization components, optical amplifier 500 may avoid crosstalk or path mismatch between the components.

After performing signal conversion, non-linear element 520 may be configured to yield the x-polarization of a combination of input signal 502, the idler signals generated, and the pump signal. Non-linear element 520 may be configured to send this polarization to wavelength selective processor 522. Furthermore, non-linear element 526 may be configured to yield the y-polarization of a combination of input signal 502, the idler signals generated, and the pump signal. Non-linear element 526 may be configured to send this polarization to wavelength selective processor 528.

Each of wavelength selective processors 522, 528 may be configured to receive a signal from the first stage of optical amplifier 500. Such reception may be made from, for example, non-linear elements 520, 526, respectively. The received signal may include a combination of input signal 502, the pump signal, and the idler signals. Wavelength selective processors 522, 528 may be implemented in a similar manner as wavelength selective processor 224 of FIG. 2. Wavelength selective processors 522, 528 may be configured to select which portions of the received signal are to be amplified using FWM. Such selection may be made based on, for example, wavelength wherein unused idler signals and other signals are filtered out. Wavelength selective processors 522, 528 may be communicatively coupled to control module 534. Control module 534 may be configured to adjust the operation of wavelength selective processors 522, 528, such as adjustment of power or phases of signals received by wavelength selective processors 522, 528, or adjustment of signals that will be filtered by wavelength selective processors 522, 528. Furthermore, wavelength selective processors 522, 528 may be adjusted to pre-compensate their input signals for the input signals' residual chromatic dispersion or for dispersion slope of HNLF resident within non-linear elements. Such adjustments may be based upon, for example, the nature or kind of input signal 502, detected output of wavelength selective processors 522, 528, or detected output of optical amplifier 500.

If input signal 502 includes WDM signals, wavelength selective processors 522, 528 may be configured to select a range including the WDM signals to be amplified, the pump signal, and the range of idler signals corresponding to each of the WDM signals.

Each of wavelength selective processors 522, 528 may be communicatively coupled to a respective reflector 524, 530. Furthermore, each of wavelength selective processors 522, 528 may be configured to send its output to the respective reflector 524, 530.

Each of reflector 524, 530 may be configured to reflect perfectly, or nearly perfectly, each wavelength of a set of received signals back to its source. Reflectors 524, 530 may be implemented in any suitable manner for reflecting its input signals back as output. The signals input into reflectors 524, 530 may be returned to wavelength selective processors 522, 528. In one embodiment, wavelength selective processors 522, 528 may be configured to allow the reflected signals to pass through from reflectors 524, 530 to non-linear elements 520, 526. In another embodiment, wavelength selective processors 522, 528 may be configured to allow the reflected signals to pass through from non-linear elements 520, 526 to reflectors 524, 530, and to perform their designated operations upon the reflected signals as they return from reflectors 524, 530 to non-linear elements 520, 526.

Upon receipt of the reflected signals containing input signal 502, the idler signals, and the pump signal, non-linear elements 520, 526 may be configured to perform phase-sensitive amplification through non-degenerate FWM. Input signal 502 and idler signals will be amplified. Thus, non-linear elements 520, 526 may be configured to bi-directionally provide signal conversion and phase-sensitive amplification for the x-polarization and y-polarization components, respectively. The FWM performed by non-linear elements 520, 526 may utilize the equidistant, or nearly equidistant, arrangement of input signal 502 and its idler signals around the pump signal. Furthermore, the FWM performed by non-linear elements 520, 526 may utilize the performance of the idler signals as conjugate signals to input signal 502. If input signal 502 includes WDM signals, non-linear elements 520, 526 may amplify the range of WDM signals and the range of the idler signals corresponding to the WDM signals.

Non-linear elements 520, 526 may be configured to send their respective amplified x-polarization and y-polarization components to polarization beam controller 518, which may be configured to combine the respective polarization components. Polarization beam controller 518 may be configured to route the result to polarization controller 516, which may be configured to perform adjustments, such as phase adjustments, to the respective components and route the result to optical circulator 514. Optical circulator 514 may be configured to route the result to filter 532.

Optical amplifier 500 may include filter 532 configured to remove the idler signals and pump signal from the result of FWM. Filter 532 may be implemented in a similar manner as filter 236 of FIG. 2. Filter 532 may be configured to only allow signals with the wavelength of the original input signal (input signal 502) to pass. Filter 532 may be configured to generate output signal 504. The result of optical amplification in output signal 504 may implement output signal 114 of FIG. 1. Filter 532 may be communicatively coupled to control module 534. Control module 534 may be configured to adjust the operation of filter 532. Such adjustments may be based upon, for example, the nature or kind of input signal 502, detected output of optical amplifier 500, or detected output of filter 532.

Control module 534 may be implemented in a similar manner as control module 238 of FIG. 2. Control module 534 may be configured to monitor performance of optical amplifier 500 and its signals including, for example, information regarding input signal 502, output signal 504, wavelength selective switch 506, polarization-mode dispersion compensator 508, pump 510, polarization controller 516, polarization beam controller 518, wavelength selective processors 522, 528, and filter 532. Such information may include, for example, wavelength, power, residual chromatic dispersion, and optical signal-to-noise ratio. Based on such information, control module 534 may be configured to adjust or control the operation of various portions of optical amplifier 500 to enhance or optimize performance of optical amplifier 500. Such portions may include, for example, wavelength selective switch 506, polarization-mode dispersion compensator 508, pump 510, polarization controller 516, polarization beam controller 518, wavelength selective processors 522, 528, and filter 532.

In operation, input signal 502 may be received by optical amplifier 500 and filtered by wavelength selective switch 506. The signal may be compensated for dispersion by polarization-mode dispersion compensator 508. The output of polarization-mode dispersion compensator 508 may be communicatively coupled to the output of pump 510 by coupler 512.

In a first stage of optical amplifier 500, signal conversion may be performed on the combination of the pump signal and input signal 502 to yield an idler signal. The resultant combination of input signal 502 and the signal of pump 510 may be routed by optical circulator 514 to polarization controller 516. Polarization controller 516 may adjust the polarization components and send the results to polarization beam controller 518. Polarization beam controller 518 may split its input into x-polarization and y-polarization components. The x-polarization component may be routed to non-linear element 520 and the y-polarization component may be routed to non-linear component 526. Non-linear element 520 may perform signal conversion on the x-polarization component. Non-linear element 526 may perform signal conversion on the y-polarization component. The signal conversion may yield an idler signal added to each respective polarization component and be combined with the pump signal and input signal 502. The idler signal and input signal 502 may be equidistant, or nearly equidistant, from the pump signal in terms of wavelength. The x-polarization component may be routed to wavelength selective processor 522. The y-polarization component may be routed to wavelength selective processor 528.

In a second stage of optical amplifier 500, non-degenerate phase-sensitive amplification may be performed on the combination of the pump signal, input signal 502, and idler signal generated by the first stage. Wavelength selective processors 522, 526 may pre-compensate their input signals for the signals' residual chromatic dispersion, pre-compensate their input signals for the dispersion slope of any HNLF or other components of non-linear elements 520, 526, or adjust their input signals' phase levels in order to maximize or optimize amplification. Wavelength selective processors 522, 526 may select or filter which portions of the combination of the pump signal, input signal 502, and idler signal will be amplified. The results may be routed to reflectors 524, 530, which may reflect the signals back to wavelength selective processors 522, 526. Wavelength selective processors 522, 526 may pass the reflected signals through to non-linear elements 520, 526. Non-linear elements 520, 526 may perform non-degenerate FWM upon the x-polarization and y-polarization components, respectively. The result of the FWM may be to amplify input signal 502 and the corresponding idler signal. Non-linear elements 520, 526 may send the amplified x-polarization and y-polarization components to polarization beam controller 518, which may reassemble the polarization components and route them to polarization controller 516. The polarization components may be adjusted by polarization controller 516, and then routed through optical circulator 514 to filter 532. Filter 532 may remove all portions of the signal other than those wavelengths originally present in input signal 502. For example, the pump signal and idler signals may be removed. Filter 532 may output the result as output signal 504.

Control module 534 may continuously monitor performance of optical amplifier 500 and its signals and adjust various components of optical amplifier 500 in real-time. Control module 534 may monitor information regarding input signal 502, output signal 504, wavelength selective switch 506, polarization-mode dispersion compensator 508, pump 510, polarization controller 516, polarization beam controller 518, wavelength selective processors 522, 528, and filter 532. Control module 534 may adjust or control the operation of various portions of optical amplifier 500 to enhance or optimize performance of optical amplifier 500, such as wavelength selective switch 506, polarization-mode dispersion compensator 508, pump 510, polarization controller 516, polarization beam controller 518, wavelength selective processors 522, 528, and filter 532. Adjustments may be made to match the nature, modulation format, polarization, frequency, or other aspects of input signal 502, or to optimize or increase amplification.

Figure 6:
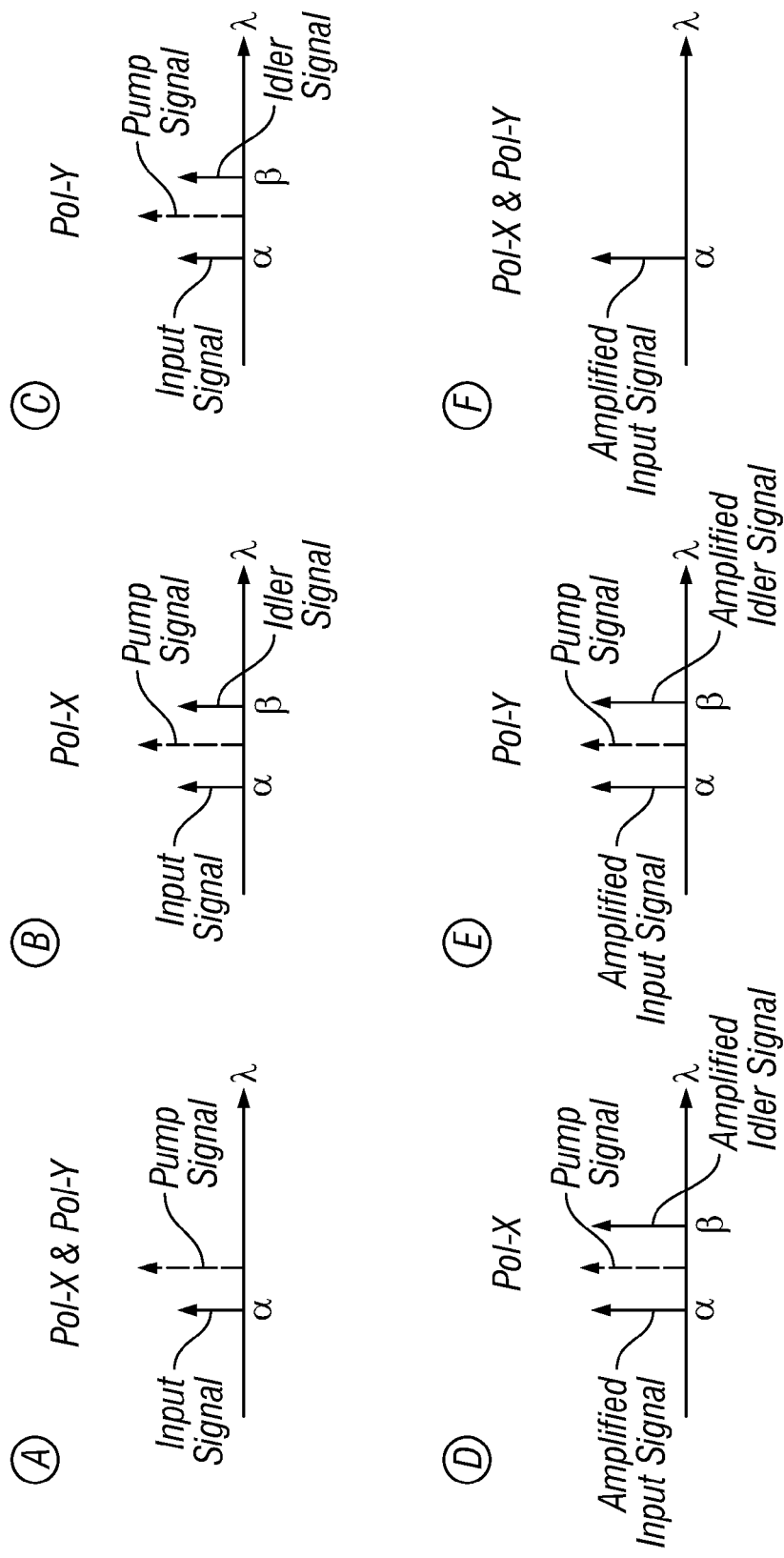
FIG. 6 is an illustration of the operation of another example embodiment of an optical amplifier for conducting optical phase-sensitive amplification on a single channel.

FIG. 6 is an illustration of the operation of optical amplifier 500 for conducting optical phase-sensitive amplification, which may include amplification of dual-polarization signals. FIG. 6 illustrates the status of signals at various reference points in optical amplifier 500 as illustrated in FIG. 5.

At (A), a degraded input signal 502 and the output of pump 510 may have been combined. Both polarizations are shown in combination. Input signal 502 may be separated from the pump signal by a wavelength distance $\alpha$.

At (B), the combined input signal 502 and pump signal may have been divided into an x-polarization component by polarization beam controller 518. The signals may have been sent through non-linear element 520 for signal conversion, yielding an idler signal. The idler signal may be separated from the pump signal by a wavelength distance $\beta$. The wavelength distances $\alpha$ and $\beta$ may be equal, or nearly equal. The combined signals may be prepared to be passed through wavelength selective processor 522, reflected by reflector 524, and reentered into non-linear element 520 for phase-sensitive amplification.

At (C), the combined input signal 502 and pump signal may have been divided into a y-polarization component by polarization beam controller 518. The signals may have been sent through non-linear element 526 for signal conversion, yielding an idler signal. The idler signal may be separated from the pump signal by a wavelength distance $\beta$. The wavelength distances $\alpha$ and $\beta$ may be equal, or nearly equal. The combined signals may be prepared to be passed through wavelength selective processor 528, reflected by reflector 530, and reentered into non-linear element 526 for phase-sensitive amplification.

At (D), the x-polarization component may have been passed through non-linear element 520 and phase-sensitive amplification may have been performed with FWM. As a result, input signal 502 and the idler signal may have been amplified.

At (E), the y-polarization component may have been passed through non-linear element 526 and phase-sensitive amplification may have been performed with FWM. As a result, input signal 502 and the idler signal may have been amplified.

At (F), the x-polarization and y-polarization components of the combined signals may have been recombined by polarization beam controller 518. Furthermore, the resultant signal set may have been filtered by filter 532 to remove the idler signal and the pump signal, leaving only the amplified version of input signal 502, which may be output signal 504.

Figure 7:
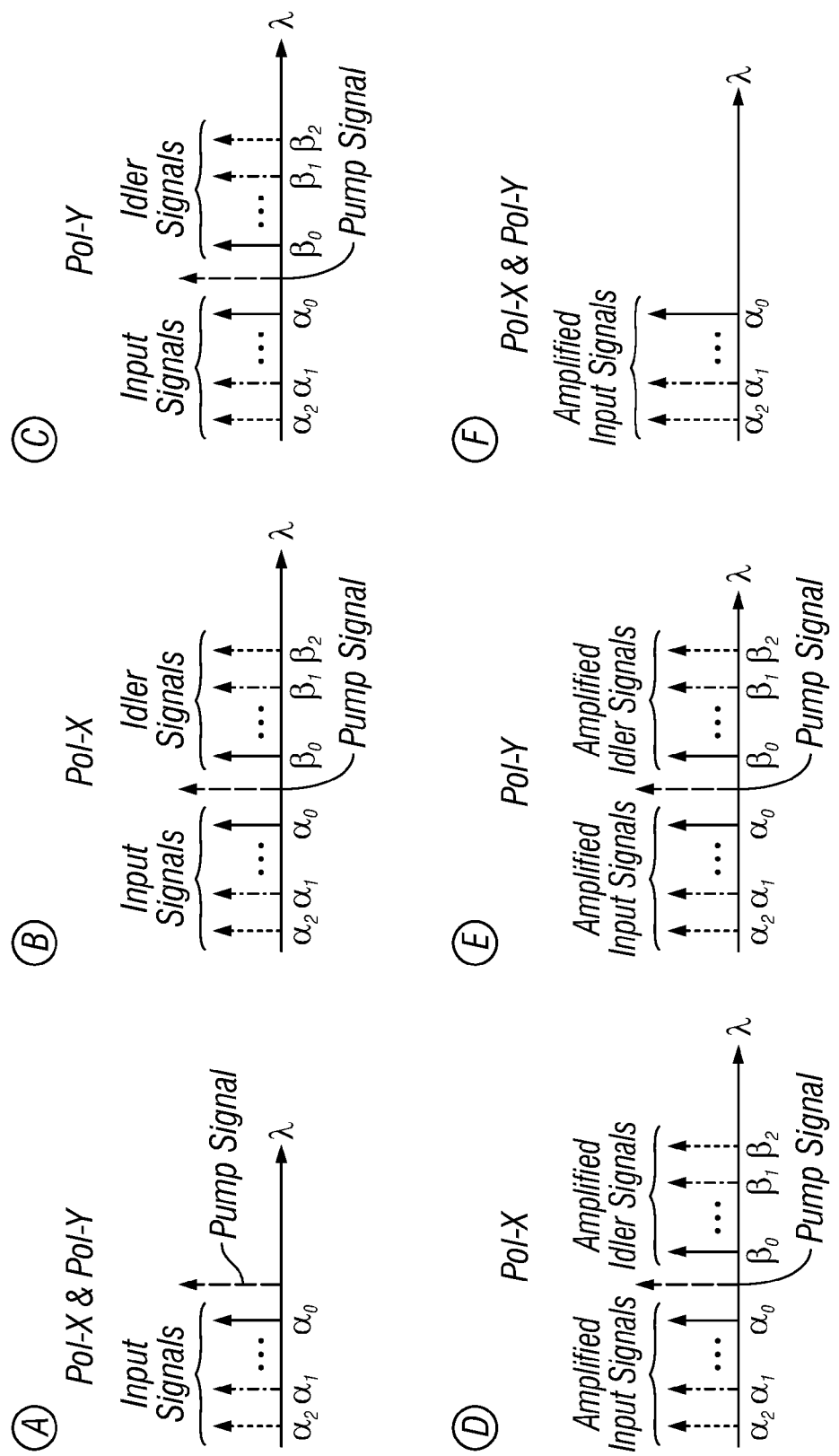
FIG. 7 is an illustration of the operation of another example embodiment of an optical amplifier for conducting optical phase-sensitive amplification on WDM channels.
Figure 8:
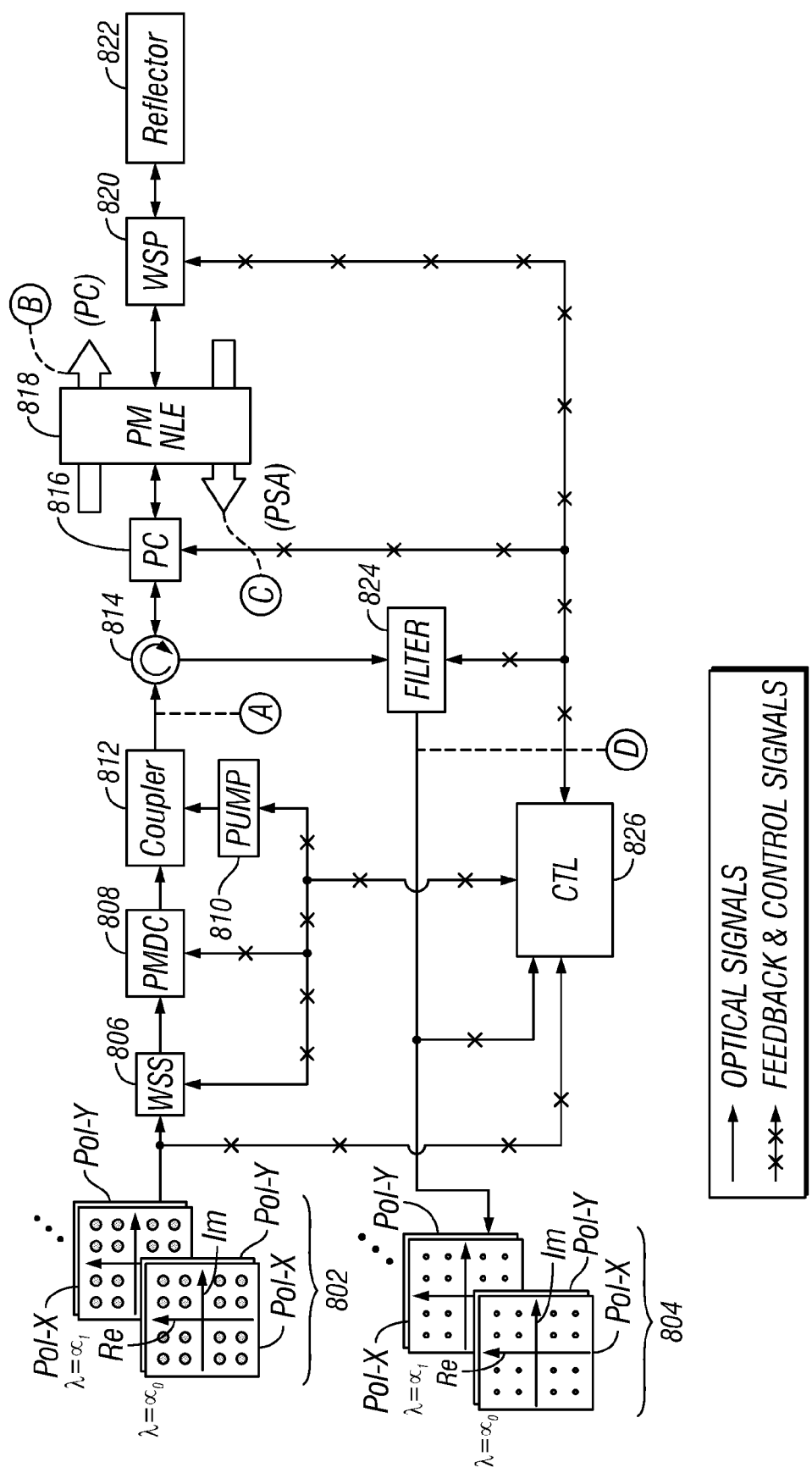
FIG. 8 is an illustration of a yet another example embodiment of an optical amplifier for conducting optical phase-sensitive amplification.

FIG. 7 is an illustration of the operation of optical amplifier 500 for conducting optical phase-sensitive amplification using WDM, which may include amplification of dual-polarization signals. FIG. 7 illustrates the status of signals at various reference points in optical amplifier 500 as illustrated in FIG. 5.

At (A), a degraded set of WDM signals of input signal 502 and the output of pump 510 may have been combined. Both polarizations are shown in combination. Each of the WDM signals of input signal 502 may each be separated from the pump signal by a wavelength distance, such as $\alpha_0$, $\alpha_1$, and $\alpha_2$, respectively. In one embodiment, each wavelength distance may be a multiple of another wavelength distance.

At (B), the combined input signal 502 and pump signal may have been divided into an x-polarization component by polarization beam controller 518. The signals may have been sent through non-linear element 520 for signal conversion, yielding a set of idler signals. Each of the idler signals illustrated may correspond to a WDM component of input signal 502. Each of the idler signals may be separated from the pump signal by a wavelength distance such as $\beta_0$, $\beta_1$, and $\beta_2$, respectively. The wavelength distances $\alpha_i$ and $\beta_i$ may be equal, or nearly equal. The combined signals may be prepared to be passed through wavelength selective processor 522, reflected by reflector 524, and reentered into non-linear element 520 for phase-sensitive amplification.

At (C), the combined input signal 502 and pump signal may have been divided into a y-polarization component by polarization beam controller 518. The signals may have been sent through non-linear element 526 for signal conversion, yielding a set of idler signals. Each of the idler signals illustrated may correspond to a WDM component of input signal 502. Each of the idler signals may be separated from the pump signal by a wavelength distance such as $\beta_0$, $\beta_1$, and $\beta_2$, respectively. The wavelength distances $\alpha_i$ and $\beta_i$ may be equal, or nearly equal. The combined signals may be prepared to be passed through wavelength selective processor 528, reflected by reflector 530, and reentered into non-linear element 526 for phase-sensitive amplification.

At (D), the x-polarization component of the combined signals may have been passed through non-linear element 520 and phase-sensitive amplification may have been performed with FWM. As a result, each WDM component of input signal 502 and the corresponding idler signal may have been amplified.

At (E), the y-polarization component of the combined signals may have been passed through non-linear element 526 and phase-sensitive amplification may have been performed with FWM. As a result, each WDM component of input signal 502 and the corresponding idler signal may have been amplified.

At (F), the x-polarization and y-polarization components of the combined signals may have been recombined by polarization beam controller 518. Furthermore, the resultant signal set may have been filtered by filter 532 to remove the set of idler signals and the pump signal, leaving only the amplified version of the WDM components of input signal 502, which may be output signal 504.

FIG. 8 is an illustration of a yet another example embodiment of an optical amplifier 800 for conducting optical phase-sensitive amplification. In one embodiment, optical amplifier 800 may be configured to support dual-polarization modulation formats. Optical amplifier 800 may implement fully or in part optical amplifier 102 of FIG. 1.

Optical amplifier 800 may include a mechanism for accepting an input signal such as input signal 802. Input signal 802 may include a plurality of WDM channels. Each such channel may correspond to a different wavelength. Such a wavelength may be denoted by $\alpha_i$. For each such channel, input signal 802 may include an x-polarization and a y-polarization component. Input signal 802 may implement input signal 110 of FIG. 1. Input signal 802 may be communicatively coupled to wavelength selective switch 806. Wavelength selective switch 806 may be implemented in a similar manner to wavelength selective switch 206 of FIG. 2, and may be configured to select what portions of input signal 802 are to be amplified with optical amplifier 800, perform wavelength demultiplexing, and switch signals on a per-wavelength basis. Wavelength selective switch 806 may be communicatively coupled to control module 826. Control module 826 may be configured to adjust the operation of wavelength selective switch 806 to, for example, select what portion of input signal 802 is to be amplified by optical amplifier 800. Such adjustments may be based upon, for example, the nature or kind of input signal 802, detected output of optical amplifier 800, or detected output of wavelength selective switch 806.

Wavelength selective switch 806 may be communicatively coupled to polarization-mode dispersion compensator 808. Polarization-mode dispersion compensator 808 may be implemented in a similar manner as polarization-mode dispersion compensator 208 of FIG. 2, and configured to compensate for residual polarization-mode dispersion in input signal 802. Polarization-mode dispersion compensator 808 may be communicatively coupled to control module 826. Control module 826 may be configured to adjust the operation of polarization-mode dispersion compensator. Such adjustments may be based upon, for example, the nature or kind of input signal 802, detected output of optical amplifier 800, or detected output of polarization-mode dispersion compensator 808.

Optical amplifier 800 may include a first stage configured to perform signal conversion to generate a conjugate signal of input signal 802. In addition, optical amplifier 800 may include a second stage configured to conduct non-degenerate FWM. Such non-degenerate FWM may be performed upon input signal 802 and the conjugate signal.

The first stage of optical amplifier 800 configured to generate a conjugate signal of input signal 802 may include a pump 810, coupler 812, optical circulator 814, polarization controller 816, and non-linear element 818.

The second stage of optical amplifier 800 configured to perform non-degenerate FWM for phase-sensitive amplification may include reflector 822, wavelength selective processor 820, non-linear element 818, and polarization controller 816. Thus, in one embodiment, non-linear element 818 may be used in both stages of optical amplifier 800.

Pump 810 may be configured and implemented in a similar manner as pump 210 of FIG. 2 by providing a pump signal with a wavelength and strength that is set in relation to the wavelength of input signal 802 that is to be amplified. The output of polarization-mode dispersion compensator 808 may be communicatively coupled to coupler 812, along with the output of pump 810. Pump 810 may be communicatively coupled to control module 826. Control module 826 may be configured to adjust the wavelength, power, phase, or other aspects of the operation of pump 810. Such adjustments may be based upon, for example, the nature or kind of input signal 802, detected output of pump 810, or detected output of optical amplifier 800.

Coupler 812 may be configured to couple the output of polarization-mode dispersion compensator 808 (including input signal 802 compensated for polarization-mode dispersion) and the output of pump 810. Coupler 812 may be communicatively coupled to optical circulator 814 and configured to provide its output thereto. Coupler 812 may be implemented in any suitable manner for coupling the inputs as described.

Optical circulator 814 may be communicatively coupled on a first input/output line to polarization controller 816 and on a second input/output line to filter 832. Optical circulator 814 may be communicatively coupled on an input line to coupler 812 and configured to receive its output. Optical circulator 814 may be implemented in a similar manner as optical circulator 222 of FIG. 2.

Polarization controller 816 may be implemented in a similar manner as polarization controller 214 of FIG. 2. Polarization controller 816 may be configured to adjust the x-polarization and y-polarization components of its input signals to maximize or increase the effects of conjugate signal generation to be performed by, for example, non-linear element 818. Such adjustments may include a polarization shifting of the x-polarization and y-polarization components. Polarization controller 816 may be communicatively coupled to control module 826. Control module 826 may be configured to adjust the operation of polarization controller 816. Such adjustments may be based upon, for example, the nature or kind of input signal 802, detected output of polarization controller 816, or detected output of optical amplifier 800. Polarization controller 816 may be configured to receive its input from optical circulator 814, perform adjustments on the x-polarization and y-polarization components if necessary, and output the results to non-linear element 818.

Non-linear element 818 may be implemented in a similar manner to non-linear elements 220, 234 of FIG. 2, except that non-linear element 818 may be further configured as a polarization-maintaining non-linear element. For example, if non-linear element 818 is implemented using fiber, such fiber may include polarization-maintaining optical fiber. Non-linear element 818 may maintain the polarization of its inputs as the signals are propagated through non-linear element 818 through maintenance of the orientation of the x-polarization and y-polarization components. Non-linear element 818 may be configured to perform signal conversion on the combined polarization components of its inputs received from polarization controller 816 to send the result to wavelength selective processor 820.

Non-linear element 818 may be configured to provide signal conversion based upon the nature of its input signals, which may include the combination of input signal 802 and pump signal from pump 810. In one embodiment, non-linear element 818 may be configured to cause an idler signal to be added to the combination of input signal 802 and the pump signal. In a further embodiment, the idler signal and input signal 802 may be equidistant, or nearly equidistant, from the pump signal. Thus, the idler signal and input signal 802 may be symmetrically, or nearly symmetrically, located on each side of the pump signal. In another embodiment, the generated idler signal may include the inverse phase as input signal 802. If input signal 802 includes multiple WDM components, non-linear element may generate an idler signal for each such WDM component. Each idler signal and the corresponding WDM component may be equidistant, or nearly equidistant, from the pump signal in terms of wavelength. Thus, the WDM components of input signal 802 and the corresponding idler signals may be symmetric, or nearly symmetric, around the pump signal. After performing signal conversion, non-linear element 818 may be configured to route its outputs to wavelength selective processor 820.

Wavelength selective processor 820 may be configured to receive a signal from the first stage of optical amplifier 800. Such reception may be made from, for example, non-linear element 818. The received signal may include a combination of input signal 802, the pump signal, and the idler signals. Wavelength selective processor 820 may be implemented in a similar manner as wavelength selective processor 224 of FIG. 2. Wavelength selective processor 820 may be configured to select which portions of the received signal are to be amplified using FWM. Such selection may be made based on, for example, wavelength wherein unused idler signals and other signals are filtered out. Wavelength selective processor 820 may be communicatively coupled to control module 826. Control module 826 may be configured to adjust the operation of wavelength selective processor 820, such as adjustment of power or phases of signals received or adjustment of signals that will be filtered. Furthermore, wavelength selective processor 820 may be adjusted to pre-compensate their input signals for the input signals' residual chromatic dispersion or for dispersion slope of HNLF resident within non-linear elements. Such adjustments may be based upon, for example, the nature or kind of input signal 802, detected output of wavelength selective processor 820, or detected output of optical amplifier 800.

If input signal 802 includes WDM signals, wavelength selective processor 820 may be configured to select a range including the WDM signals to be amplified, the pump signal, and the range of idler signals corresponding to each of the WDM signals.

Wavelength selective processors 820 may be communicatively coupled to a reflector 822. Furthermore, wavelength selective processor 820 may be configured to send its output to reflector 822.

Reflector 822 may be configured to reflect perfectly, or nearly perfectly, each wavelength of a set of received signals back to its source. Reflector 822 may be implemented in any suitable manner for reflecting its input signals back as output. The signals input into reflector 822 may be returned to wavelength selective processor 820. In one embodiment, wavelength selective processors 820 may be configured to allow the reflected signals to pass through from reflector 822 to non-linear element 818. In another embodiment, wavelength selective processor 820 may be configured to allow the reflected signals to pass through from non-linear element 818 to reflector 822, and to perform their designated operations upon the reflected signals as they return from reflector 822 to non-linear element 818.

Upon receipt of the reflected signals containing input signal 802, the idler signals, and the pump signal, non-linear element 818 may be configured to perform phase-sensitive amplification through non-degenerate FWM. Input signal 802 and idler signals will be amplified. Thus, non-linear element 818 may be configured to bi-directionally provide signal conversion and phase-sensitive amplification for the x-polarization and y-polarization components. The FWM performed by non-linear element 818 may utilize the equidistant, or nearly equidistant, arrangement of input signal 802 and its idler signals around the pump signal. Furthermore, the FWM performed by non-linear element 818 may utilize the performance of the idler signals as conjugate signals to input signal 802. If input signal 802 includes WDM signals, non-linear element 818 may amplify the range of WDM signals and the range of the idler signals corresponding to the WDM signals.

Non-linear element 818 may be configured to its respective combined x-polarization and y-polarization components to polarization controller 816, which may be configured to perform adjustments, such as phase adjustments, to the respective components and route the result to optical circulator 814. Optical circulator 814 may be configured to route the result to filter 824.

Optical amplifier 800 may include filter 824 configured to remove the idler signals and pump signal from the result of FWM. Filter 824 may be implemented in a similar manner as filter 236 of FIG. 2. Filter 824 may be configured to only allow signals with the wavelength of the original input signal (input signal 802) to pass. Filter 824 may be configured to generate output signal 804. The result of optical amplification in output signal 804 may implement output signal 114 of FIG. 1. Filter 824 may be communicatively coupled to control module 826. Control module 826 may be configured to adjust the operation of filter 824. Such adjustments may be based upon, for example, the nature or kind of input signal 802, detected output of optical amplifier 800, or detected output of filter 824.

Control module 826 may be implemented in a similar manner as control module 238 of FIG. 2. Control module 826 may be configured to monitor performance of optical amplifier 800 and its signals including, for example, information regarding input signal 802, output signal 804, wavelength selective switch 806, polarization-mode dispersion compensator 808, pump 810, polarization controller 816, wavelength selective processor 820, and filter 824. Such information may include, for example, wavelength, power, residual chromatic dispersion, and optical signal-to-noise ratio. Based on such information, control module 826 may be configured to adjust or control the operation of various portions of optical amplifier 800 to enhance or optimize performance of optical amplifier 800. Such portions may include, for example, wavelength selective switch 806, polarization-mode dispersion compensator 808, pump 810, polarization controller 816, wavelength selective processor 820, and filter 822.

In operation, input signal 802 may be received by optical amplifier 800 and filtered by wavelength selective switch 806. The signal may be compensated for dispersion by polarization-mode dispersion compensator 808. The output of polarization-mode dispersion compensator 808 may be communicatively coupled to the output of pump 810 by coupler 812.

In a first stage of optical amplifier 800, signal conversion may be performed on the combination of the pump signal and input signal 802 to yield an idler signal. The resultant combination of input signal 802 and the signal of pump 810 may be routed by optical circulator 814 to polarization controller 816. Polarization controller 816 may adjust the polarization components and send the results to non-linear element 818. Non-linear element 818 may process received signals while maintaining polarization. Non-linear element 818 may perform signal conversion on the combined x-polarization and y-polarization components. The signal conversion may yield an idler signal added to the combined x-polarization and y-polarization components and be combined with the pump signal and input signal 802. The idler signal and input signal 802 may be equidistant, or nearly equidistant, from the pump signal in terms of wavelength. The combined x-polarization and y-polarization components may be routed to wavelength selective processor 820.

In a second stage of optical amplifier 800, non-degenerate phase-sensitive amplification may be performed on the combination of the pump signal, input signal 802, and idler signal generated by the first stage. Wavelength selective processor 820 may pre-compensate its input signals for the signals' residual chromatic dispersion, pre-compensate its input signals for the dispersion slope of any HNLF or other components of non-linear element 818, or adjust its input signals' phase levels in order to maximize or optimize amplification. Wavelength selective processor 820 may select or filter which portions of the combination of the pump signal, input signal 802, and idler signal will be amplified. The results may be routed to reflector 822, which may reflect the signals back to wavelength selective processor 820. Wavelength selective processor 820 may pass the reflected signals through to non-linear element 818. Non-linear elements 818 may perform non-degenerate FWM upon the combined x-polarization and y-polarization components. The result of the FWM may be to amplify input signal 802 and the corresponding idler signal. Non-linear element 818 may send the amplified x-polarization and y-polarization components to polarization controller 816. The polarization components may be adjusted by polarization controller 816, and then routed through optical circulator 814 to filter 824. Filter 824 may remove all portions of the signal other than those wavelengths originally present in input signal 802. For example, the pump signal and idler signals may be removed. Filter 824 may output the result as output signal 804.

Control module 826 may continuously monitor performance of optical amplifier 800 and its signals and adjust various components of optical amplifier 800 in real-time. Control module 834 may monitor information regarding input signal 802, output signal 804, wavelength selective switch 806, polarization-mode dispersion compensator 808, pump 810, polarization controller 816, wavelength selective processor 820, and filter 824. Control module 826 may adjust or control the operation of various portions of optical amplifier 800 to enhance or optimize performance of optical amplifier 800, such as wavelength selective switch 806, polarization-mode dispersion compensator 808, pump 810, polarization controller 816, wavelength selective processor 820, and filter 824. Adjustments may be made to match the nature, modulation format, polarization, frequency, or other aspects of input signal 802, or to optimize or increase amplification.

Figure 9:
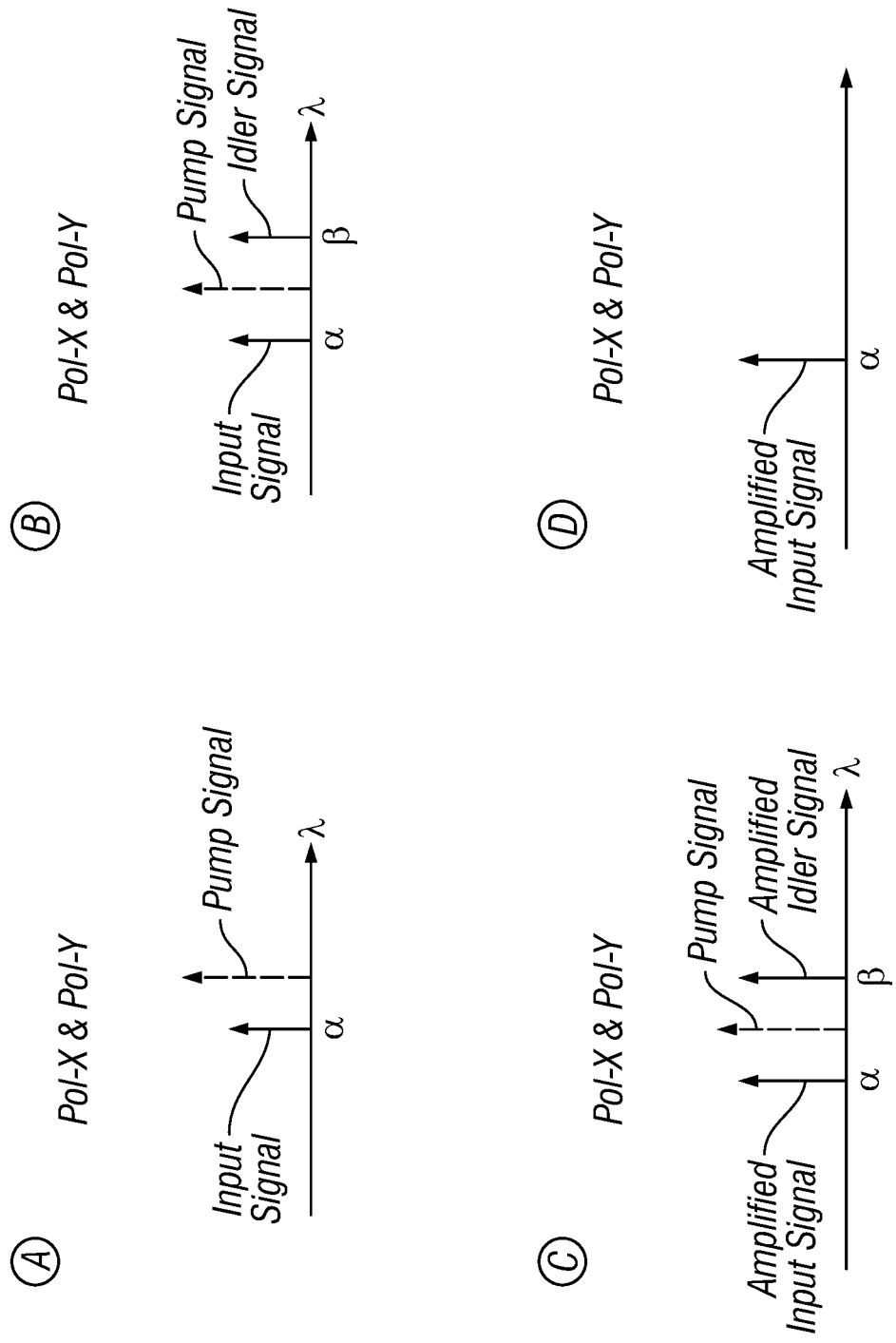
FIG. 9 is an illustration of the operation of yet another example embodiment of an optical amplifier for conducting optical phase-sensitive amplification on a single channel.

FIG. 9 is an illustration of the operation of optical amplifier 800 for conducting optical phase-sensitive amplification, which may include amplification of dual-polarization signals. FIG. 9 illustrates the status of signals at various reference points in optical amplifier 800 as illustrated in FIG. 8.

At (A), a degraded input signal 802 and the output of pump 810 may have been combined. Both polarizations are shown in combination. Input signal 802 may be separated from the pump signal by a wavelength distance $\alpha$.

At (B), the combined input signal 502 and pump signal may have been sent through non-linear element 818 for signal conversion, yielding an idler signal. The idler signal may be separated from the pump signal by a wavelength distance $\beta$. The wavelength distances $\alpha$ and $\beta$ may be equal, or nearly equal. The combined signals may be prepared to be passed through wavelength selective processor 820, reflected by reflector 822, and reentered into non-linear element 818 for phase-sensitive amplification.

At (C), the combined signals may have been passed through non-linear element 818 and phase-sensitive amplification may have been performed with FWM. As a result, input signal 802 and the idler signal may have been amplified.

At (D), the combined signals may have been filtered by filter 824 to remove the idler signal and the pump signal, leaving only the amplified version of input signal 802, which may be output signal 804.

Figure 10:
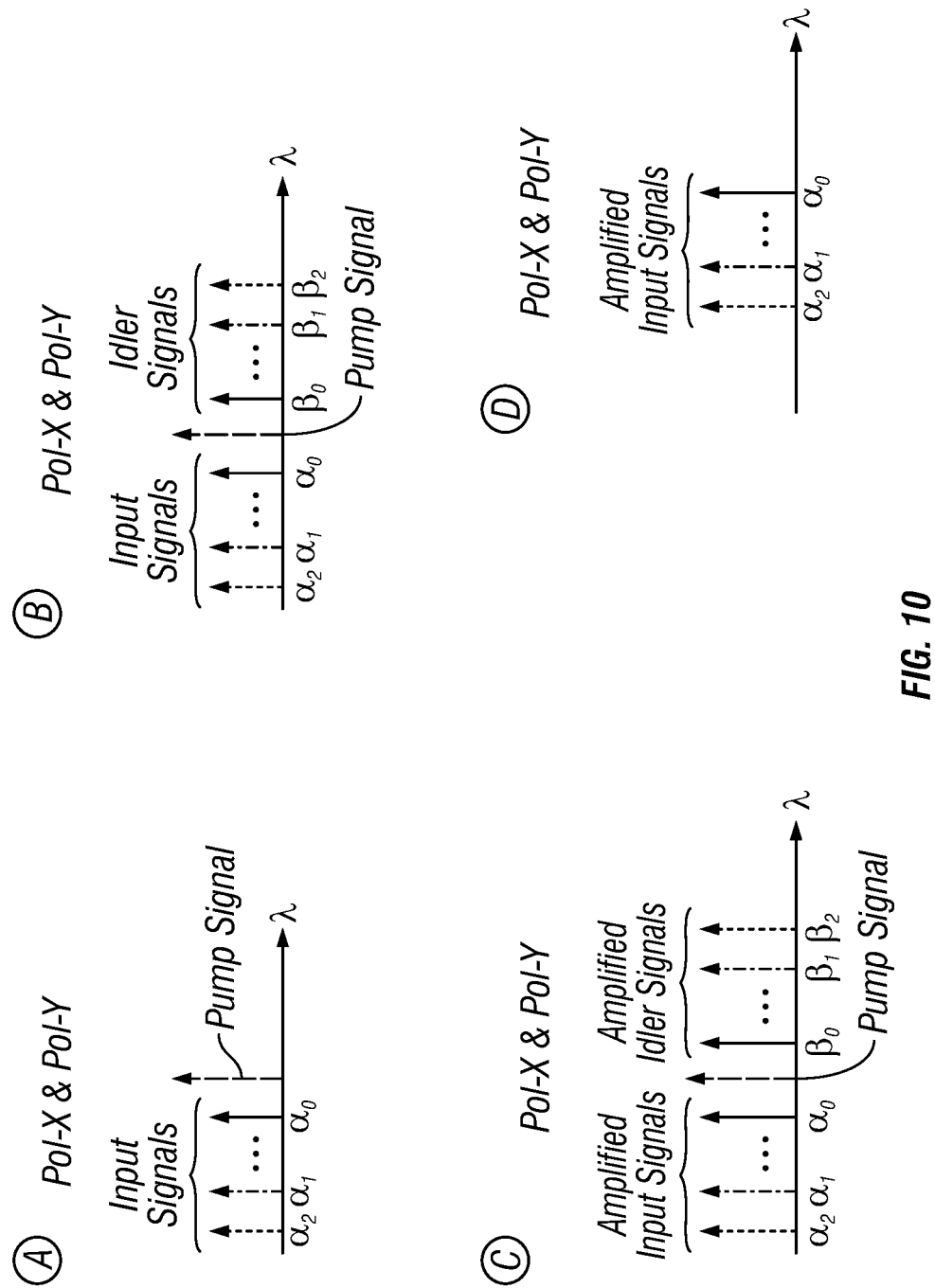
FIG. 10 is an illustration of the operation of yet another example embodiment of an optical amplifier for conducting optical phase-sensitive amplification on WDM channels.

FIG. 10 is an illustration of the operation of optical amplifier 800 conducting optical phase-sensitive amplification using WDM, which may include amplification of dual-polarization signals. FIG. 10 illustrates the status of signals at various reference points in optical amplifier 800.

At (A), a degraded set of WDM signals of input signal 802 and the output of pump 810 may have been combined. Both polarizations are shown in combination. Input signal 802 may be separated from the pump signal by a wavelength distance, such as $\alpha_0$, $\alpha_1$, and $\alpha_2$, respectively. In one embodiment, each wavelength distance may be a multiple of another wavelength distance.

At (B), the combined input signal 802 and pump signal may have been sent through non-linear element 818 for signal conversion, yielding a set of idler signals. Each of the idler signals illustrated may correspond to a WDM component of input signal 802. Each of the idler signals may be separated from the pump signal by a wavelength distance such as $\beta_0$, $\beta_1$, and $\beta_2$, respectively. The wavelength distances $\alpha_i$ and $\beta_i$ may be equal, or nearly equal. The combined signals may be prepared to be passed through wavelength selective processor 820, reflected by reflector 822, and reentered into non-linear element 818 for phase-sensitive amplification.

At (C), the combined signals may have been passed through non-linear element 818 and phase-sensitive amplification may have been performed with FWM. As a result, each WDM component of input signal 802 and the corresponding idler signal may have been amplified.

At (D), the combined signals may have been filtered by filter 824 to remove the idler signal and the pump signal, leaving only the amplified version of the WDM components of input signal 802, which may be output signal 804.

Figure 11:
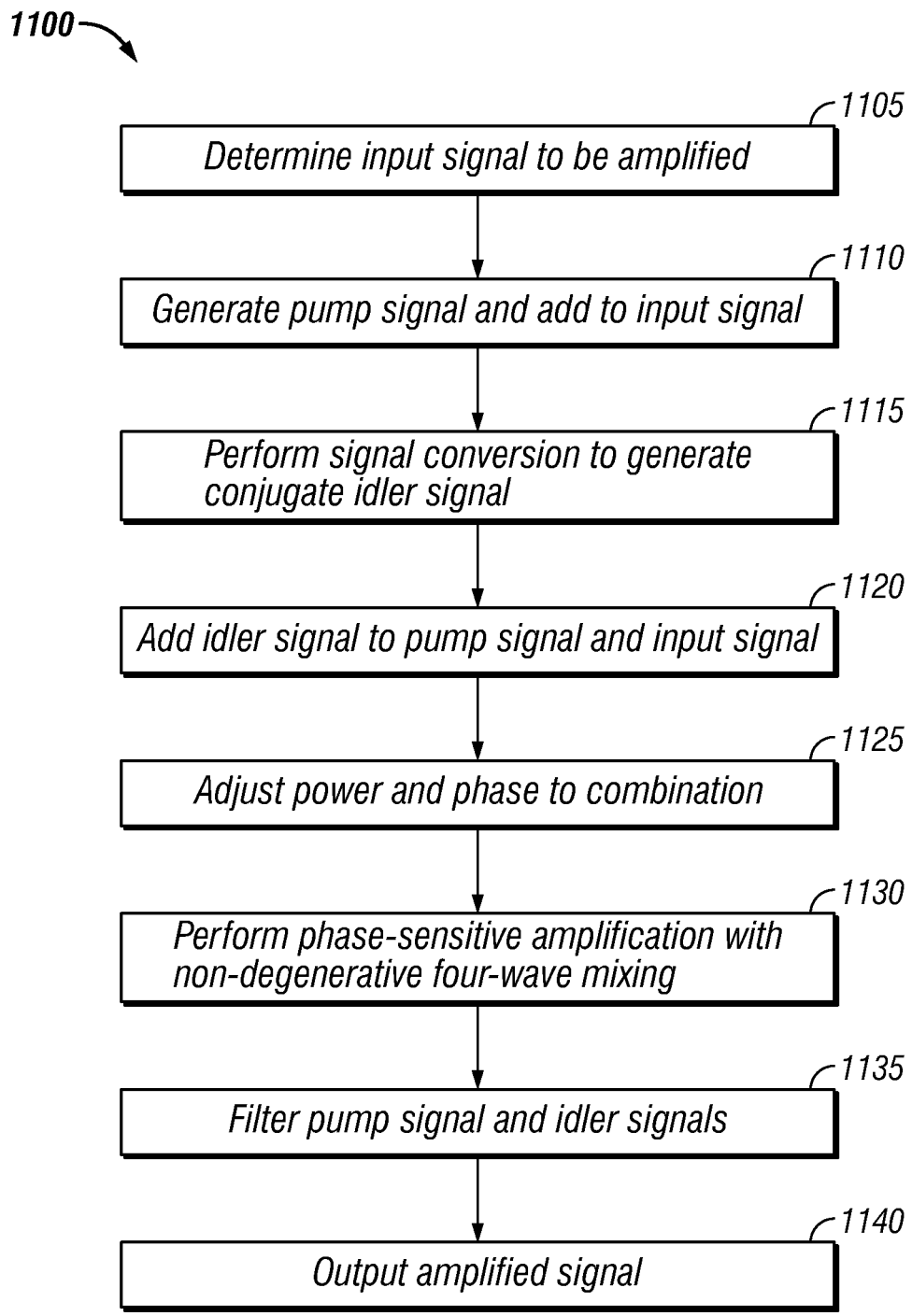
FIG. 11 is an example embodiment of a method for optical phase-sensitive amplification.

FIG. 11 is an example embodiment of a method 1100 for optical phase-sensitive amplification. In one embodiment, method 1100 may be applied to signals with dual-polarization modulation formats.

In 1105, an input signal to be amplified may be determined. The signal may be modulated using, for example, m-QAM or m-PSK modulation techniques. The signal may include an x-polarization and a y-polarization component. Furthermore, the signal may be multiplexed using WDM. Based on the determination of the signal, parameters for performing other elements of method 1100 may be determined. Portions of the input signal may be filtered or selected such that a desired portion of the input signal will be amplified. Analysis of the signal, software settings, user settings, and the physical embodiment of the system or optical amplifier may be used to determine how to handle the type of signal. For example, the pump signal generated and selected may be based upon such analysis.

In 1110, a pump signal may be generated and added to the input signal. The pump signal may be a given wavelength distance from the input signal.

In 1115, signal conversion may be applied to the resultant signal. Such signal conversion may be performed to generate a conjugate, idler signal. The idler signal and the input signal may be equidistant, or nearly equidistant, from the pump signal in terms of wavelength. Signal conversion may be applied, for example, by passing the resultant signal through an optical non-linear element. In one embodiment, the resultant signal may be divided into an x-polarization component and a y-polarization component, and the polarization components may be passed through the optical non-linear element bi-directionally. In another embodiment, the resultant signal may be divided into an x-polarization component and a y-polarization component, and the polarization components may be passed through two separate optical non-linear elements. In yet another embodiment, the resultant signal may be preserved with both x-polarization component and a y-polarization component and passed through a polarization maintaining non-linear element. If the input signal includes WDM components, idler signals may be generated for each WDM component. Each pair of WDM component and idler signal may be equidistant, or nearly equidistant, from the pump signal in terms of wavelength. In 1120, the generated idler signal may be added to the resultant signal. In one embodiment, 1115 and 1120 may be performed simultaneously.

In 1125, the resultant signal may be adjusted to optimize phase-sensitive amplification. For example, the phase of each of the pump signal, idler signal, and input signal may be adjusted. Furthermore, phase or dispersion may be compensated and adjusted. Furthermore, specific wavelengths to be amplified may be selected, wherein additional unnecessary idler signals are filtered.

In 1130, phase-sensitive amplification may be performed on the resultant signal. The idler signal and the input signal may be amplified. If the input signal includes WDM components, each WDM component and the corresponding idler signal may be amplified. Phase-sensitive amplification may be performed by conducting non-degenerate FWM by passing the resultant signal through an optical non-linear element. In one embodiment, phase-sensitive amplification may be performed by dividing the resultant signal into an x-polarization component and a y-polarization component, and passing the polarization components through an optical non-linear element bi-directionally. In another embodiment, the resultant signal may be divided into an x-polarization component and a y-polarization component, and the polarization components may be passed through two separate optical non-linear elements. In such an embodiment, a single optical non-linear element may be used to conduct both signal conversion and phase-sensitive amplification for a given polarization by performing the actions bi-directionally. To facilitate such bi-directional actions, the resultant signal may be reflected after exiting the optical non-linear element to then be returned to the same optical non-linear element. In yet another embodiment, the resultant signal may be preserved with both x-polarization component and a y-polarization component and passed through a polarization maintaining non-linear element.

In 1135, the resultant signal may be filtered. The pump signal and idler signals may be removed, leaving an amplified version of the original input signal. In 1140, the amplified signal may be output. Method 1100 may repeat as necessary.

Method 1100 may be implemented using the system, optical amplifiers, and operation of FIGS. 1-10, or any other system or device operable to implement method 1100. As such, the preferred initialization point for method 1100 and the order of the steps comprising method 1100 may depend on the implementation chosen. In some embodiments, some steps may be optionally omitted, repeated, or combined. In certain embodiments, method 1100 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as other tangible, non-transitory media; and/or any combination of the foregoing.

Although the present invention has been described with several embodiments, various changes and modifications may be suggested to one skilled in the art. It is intended that the present invention encompass such changes and modifications as fall within the scope of the appended claims.

What is claimed is:

1. A method for amplifying optical signals, comprising:
    determining a source optical signal;
    generating a first resultant signal including a pump signal and the source optical signal;
    sending the first resultant signal through a non-linear element to generate a second resultant signal including the first resultant signal and an idler signal;
    sending the second resultant signal through a non-linear element to perform phase-sensitive amplification, the phase-sensitive amplification resulting in a third resultant signal including an amplified source optical signal, the pump signal, and the idler signal;
    filtering the third resultant signal to remove the pump signal and the idler signal; and
    outputting the amplified source optical signal.

2. The method of claim 1, wherein:
    the difference between a wavelength of the pump signal and a wavelength of the source optical signal comprises a first wavelength distance;
    the difference between a wavelength of the pump signal and a wavelength of the idler signal comprises a second wavelength distance; and
    the first wavelength distance and the second wavelength distance are approximately equal.

3. The method of claim 1, wherein sending the first resultant signal through a non-linear element includes:
    splitting the first resultant signal into an x-polarization component and a y-polarization component;
    simultaneously sending the x-polarization component and the y-polarization component bi-directionally through two ends of a non-linear element; and
    combining the x-polarization component and the y-polarization component.

4. The method of claim 1, wherein sending the second resultant signal through a non-linear element includes:
    splitting the first resultant signal into an x-polarization component and a y-polarization component;
    simultaneously sending the x-polarization component and the y-polarization component bi-directionally through two ends of a non-linear element; and
    combining the x-polarization component and the y-polarization component.

5. The method of claim 1, wherein sending the first resultant signal through a non-linear element includes:
    splitting the first resultant signal into an x-polarization component and a y-polarization component; and
    sending the x-polarization component unidirectionally through a first non-linear element in a first direction; and
    sending the y-polarization component unidirectionally through a second non-linear element in a second direction;
    wherein the second resultant signal includes a result of sending the x-polarization component unidirectionally through the first non-linear element received and a result of sending the y-polarization component unidirectionally through the second non-linear element.

6. The method of claim 5, wherein sending the second resultant signal through a non-linear element includes:
    sending, in a direction opposite to the first direction, the result of sending the x-polarization through the first non-linear element; and
    sending, in a direction opposite to the second direction, the result of sending the y-polarization through the second non-linear element.

7. The method of claim 5, wherein the first non-linear element and the second non-linear element are the same non-linear element.

8. The method of claim 5, wherein the first non-linear element and the second non-linear element include a polarization maintaining non-linear element.

9. The method of claim 1, wherein the phase-sensitive amplification includes four-wave-mixing.

10. The method of claim 1, wherein the source optical signal includes a plurality of wavelength division multiplexing components.

11. The method of claim 1, wherein the source optical signal has been modulated using at least one of phase-shift keying or on-off keying.

12. The method of claim 1, wherein the source optical signal has been modulated using quadrature amplitude modulation.

13. A system for amplifying optical signals, comprising:
    an input configured to accept a source optical signal;
    a pump source configured to generate a pump signal;
    a coupler configured to add the pump signal to the source optical signal to yield a first resultant signal;
    a first controller configured to:
        split the first resultant signal into an x-polarization component and a y-polarization component;
        send the x-polarization component of the first resultant signal and the y-polarization component of the first resultant signal bi-directionally through a first non-linear element to generate an x-polarization component and a y-polarization component of a second resultant signal including the first resultant signal and an idler signal;
    a second controller configured to send the x-polarization component of the second resultant signal and the y-polarization component of the second resultant signal bi-directionally through a second non-linear element to perform phase-sensitive amplification, the phase-sensitive amplification resulting in a third resultant signal including an amplified source optical signal; and
    a filter configured to filter the third resultant signal and output the amplified source optical signal.

14. The system of claim 13, wherein:
    the difference between a wavelength of the pump signal and a wavelength of the source optical signal comprises a first wavelength distance;
    the difference between a wavelength of the pump signal and a wavelength of the idler signal comprises a second wavelength distance; and
    the first wavelength distance and the second wavelength distance are approximately equal.

15. The system of claim 13, wherein the phase-sensitive amplification includes four-wave-mixing.

16. The system of claim 13, wherein the source optical signal includes a plurality of wavelength division multiplexing components.

17. The system of claim 13, wherein the source optical signal has been modulated using at least one of phase-shift keying and on-off keying.

18. The system of claim 13, wherein the source optical signal has been modulated using quadrature amplitude modulation.

19. A system for amplifying optical signals, comprising:
an input configured to accept a source optical signal;
a pump source configured to generate a pump signal;
a coupler configured to add the pump signal to the source optical signal to yield a first resultant signal;
a controller configured to:
  split the first resultant signal into an x-polarization component and a y-polarization component;
  route the x-polarization component of the first resultant signal bi-directionally through a first non-linear element to yield an x-polarization component of a second resultant signal, the first non-linear element configured to perform phase-sensitive amplification on the x-polarization component of the first resultant signal;
  route the y-polarization component of the first resultant signal bi-directionally through a second non-linear element to yield an y-polarization component of the second resultant signal, the second non-linear element configured to perform phase-sensitive amplification on the y-polarization component of the first resultant signal;
  combine the x-polarization component of the second resultant signal and the y-polarization component of the second resultant signal to yield the second resultant signal; and
a filter configured to filter the second resultant signal and output an amplified source optical signal.

20. The system of claim 19, wherein routing the x-polarization component of the first resultant signal bi-directionally through a first non-linear element includes:
sending the x-polarization of the first resultant signal component through the first non-linear element in a first direction to add an idler signal to the x-polarization component; and
sending the x-polarization component of the first resultant signal, including the idler signal, through the first non-linear element in a second direction to perform phase-sensitive amplification, yielding the x-polarization polarization component of the second resultant signal;
wherein the first direction and second direction are opposites.

21. The system of claim 20, wherein the system further comprises a reflector communicatively coupled to the first non-linear element and configured to reflect the x-polarization component of the first resultant signal, including the idler signal, back to the first non-linear element to facilitate the sending the x-polarization component through the first non-linear element in the second direction.

22. The system of claim 20, wherein:
the difference between a wavelength of the pump signal and a wavelength of the source optical signal comprises a first wavelength distance;
the difference between a wavelength of the pump signal and a wavelength of the idler signal comprises a second wavelength distance; and
the first wavelength distance and the second wavelength distance are approximately equal.

23. The system of claim 19, wherein the phase-sensitive amplification includes four-wave-mixing.

24. The system of claim 19, wherein the source optical signal includes a plurality of wavelength division multiplexing components.

25. The system of claim 19, wherein the source optical signal has been modulated using at least one of phase-shift keying and on-off keying.

26. The system of claim 19, wherein the source optical signal has been modulated using quadrature amplitude modulation.

27. A system for amplifying optical signals, comprising:
an input configured to accept a source optical signal;
a pump source configured to generate a pump signal;
a coupler configured to add the pump signal to the source optical signal to yield a first resultant signal;
a polarization-maintaining non-linear element communicatively coupled to the coupler and configured to:
  add an idler signal to the first resultant signal as the first resultant signal passes through the polarization-maintaining non-linear element in a first direction, yielding a second resultant signal;
  send the second resultant signal to be rerouted to the polarization-maintaining non-linear element;
  receive the second resultant signal; and
  perform phase-sensitive amplification on the second resultant signal as the second resultant signal passes through the polarization-maintaining non-linear element in a second direction, yielding an amplified signal;
  wherein the first direction and second direction are opposites; and
a filter configured to filter the amplified signal and output an amplified source optical signal.

28. The system of claim 27, wherein the system further comprises a reflector communicatively coupled to the polarization-maintaining non-linear element and configured to reflect the second resultant signal back to the polarization-maintaining non-linear element in the second direction.

29. The system of claim 27, wherein:
the difference between a wavelength of the pump signal and a wavelength of the source optical signal comprises a first wavelength distance;
the difference between a wavelength of the pump signal and a wavelength of the idler signal comprises a second wavelength distance; and
the first wavelength distance and the second wavelength distance are approximately equal.

30. The system of claim 27, wherein the phase-sensitive amplification includes four-wave-mixing.

31. The system of claim 27, wherein the source optical signal includes a plurality of wavelength division multiplexing components.

32. The system of claim 27, wherein the source optical signal has been modulated using phase-shift keying.

33. The system of claim 27, wherein the source optical signal has been modulated using quadrature amplitude modulation.

* * * * *